United States Patent [19]
Hanaoka et al.

[11] Patent Number: 6,078,334
[45] Date of Patent: Jun. 20, 2000

[54] 3-D TEXTURE MAPPING PROCESSOR AND 3-D IMAGE RENDERING SYSTEM USING THE SAME

[75] Inventors: Toshiharu Hanaoka, Chiba; Hiroaki Yabe, Matsudo; Takeshi Hashimoto, Chiba, all of Japan

[73] Assignee: Sharp Kabushiki Kaisha, Osaka, Japan

[21] Appl. No.: 09/064,036

[22] Filed: Apr. 22, 1998

[30] Foreign Application Priority Data

Apr. 23, 1997 [JP] Japan .................................. 9-106340

[51] Int. Cl.⁷ ........................................ G06F 15/00
[52] U.S. Cl. ................................................ 345/430
[58] Field of Search ................................ 345/425, 428, 345/429, 430, 431, 432

[56] References Cited

U.S. PATENT DOCUMENTS 5,557,711  9/1996  Malzbender ............................. 395/122
5,761,601  6/1998  Kabayashi et al. ..................... 395/130

FOREIGN PATENT DOCUMENTS 6-34886 0  12/1994  Japan .
7-254072   10/1995  Japan .

OTHER PUBLICATIONS

"Computer Graphics", Takeshi Akui, K. K. Shokodo, pp. 89–91 (May 30, 1993).

*Primary Examiner*—Phu K. Nguyen

[57] ABSTRACT

A three-dimensional image rendering portion, based on image data, performs geometric transformation, projection transformation, etc. and further applies texture data from the texture memory onto polygons, to thereby generate graphic data of a 3-D image. This graphic data is used as pixel data for a frame of image and written into the frame memory. A 3-D texture modeling value generating circuit performs arithmetic operations on 3-D texture modeling values of asperities of the textures, using coordinate data given from the 3-D image rendering portion, bump data stored in the texture memory and parameters stored in the register. These 3-D texture modeling values are provided to 3-D texture modeling circuit where, based on these values, the data from the frame memory is formed into a 3-dimensional form, which in turn is displayed on the display unit.

14 Claims, 16 Drawing Sheets

- Polygon
- Background
- Texture

- Polygon
- Background
- 3-D modeled Texture

FIG.4A

| | 0 | 0 | 0 | 2 | 0 | -1 | 0 | 0 | 1 | 1 | 0 |
|---|---|---|---|---|---|---|---|---|---|---|---|
| | a | b | c | d | e | f | g | h | i | j | k |
| | $a_1$ | $b_1$ | $c_1$ | $d_1$ | $e_1$ | $f_1$ | $g_1$ | $h_1$ | $i_1$ | $j_1$ | $k_1$ |

FIG.4B

| a | d | e | e | e | e | f | i | j | k | k |
|---|---|---|---|---|---|---|---|---|---|---|
| $a_2$ | $b_2$ | $c_2$ | $d_2$ | $e_2$ | $f_2$ | $g_2$ | $h_2$ | $i_2$ | $j_2$ | $k_2$ |

Data from the frame memory and 3-D texture modeling value generator

FIG. 7A

| 3-D texture modeling value | 0 | 0 | 0 | 2 | 0 | -1 | 0 | 0 | 1 | 1 | 0 |
|---|---|---|---|---|---|---|---|---|---|---|---|
| Color value | a | b | c | d | e | f | g | h | i | j | k |

$a_1$ $b_1$ $c_1$ $d_1$ $e_1$ $f_1$ $g_1$ $h_1$ $i_1$ $j_1$ $k_1$

FIG. 7B Data in the line buffer

| Virtual 3-D texture modeling value | 0 | - | - | - | - | - | - | - | - | - |
|---|---|---|---|---|---|---|---|---|---|---|
| Color value | a | - | - | - | - | - | - | - | - | - |

| 0 | 0 | 0 | - | - | - | - | - | - | - |
|---|---|---|---|---|---|---|---|---|---|
| a | b | c | - | - | - | - | - | - | - |

| 0 | 2 | 0 | - | - | - | - | - | - | - |
|---|---|---|---|---|---|---|---|---|---|
| a | d | c | - | - | - | - | - | - | - |

| 0 | 2 | 2 | 1 | - | - | - | - | - | - |
|---|---|---|---|---|---|---|---|---|---|
| a | d | e | e | - | - | - | - | - | - |

| 0 | 2 | 2 | 1 | 0 | -1 | -1 | - | - | - |
|---|---|---|---|---|---|---|---|---|---|
| a | d | e | e | e | f | - | - | - | - |

| 0 | 2 | 2 | 1 | 0 | -1 | -1 | 1 | 1 | 1 | 0 |
|---|---|---|---|---|---|---|---|---|---|---|
| a | d | e | e | e | f | i | j | k | k |

| | 0 | 0 | 0 | 2 | 0 | -1 | 0 | 0 | 1 | 1 | 0 |
|---|---|---|---|---|---|---|---|---|---|---|---|
| | a | b | c | d | e | f | g | h | i | j | k |
| | $a_1$ | $b_1$ | $c_1$ | $d_1$ | $e_1$ | $f_1$ | $g_1$ | $h_1$ | $i_1$ | $j_1$ | $k_1$ |

FIG.9B

| a | b | c | e | e | f | f | h | j | k | k |
|---|---|---|---|---|---|---|---|---|---|---|

FIG.9C

| | a | d | d | d | e | e | g | i | j | j | k |
|---|---|---|---|---|---|---|---|---|---|---|---|
| | $a_2$ | $b_2$ | $c_2$ | $d_2$ | $e_2$ | $f_2$ | $g_2$ | $h_2$ | $i_2$ | $j_2$ | $k_2$ |

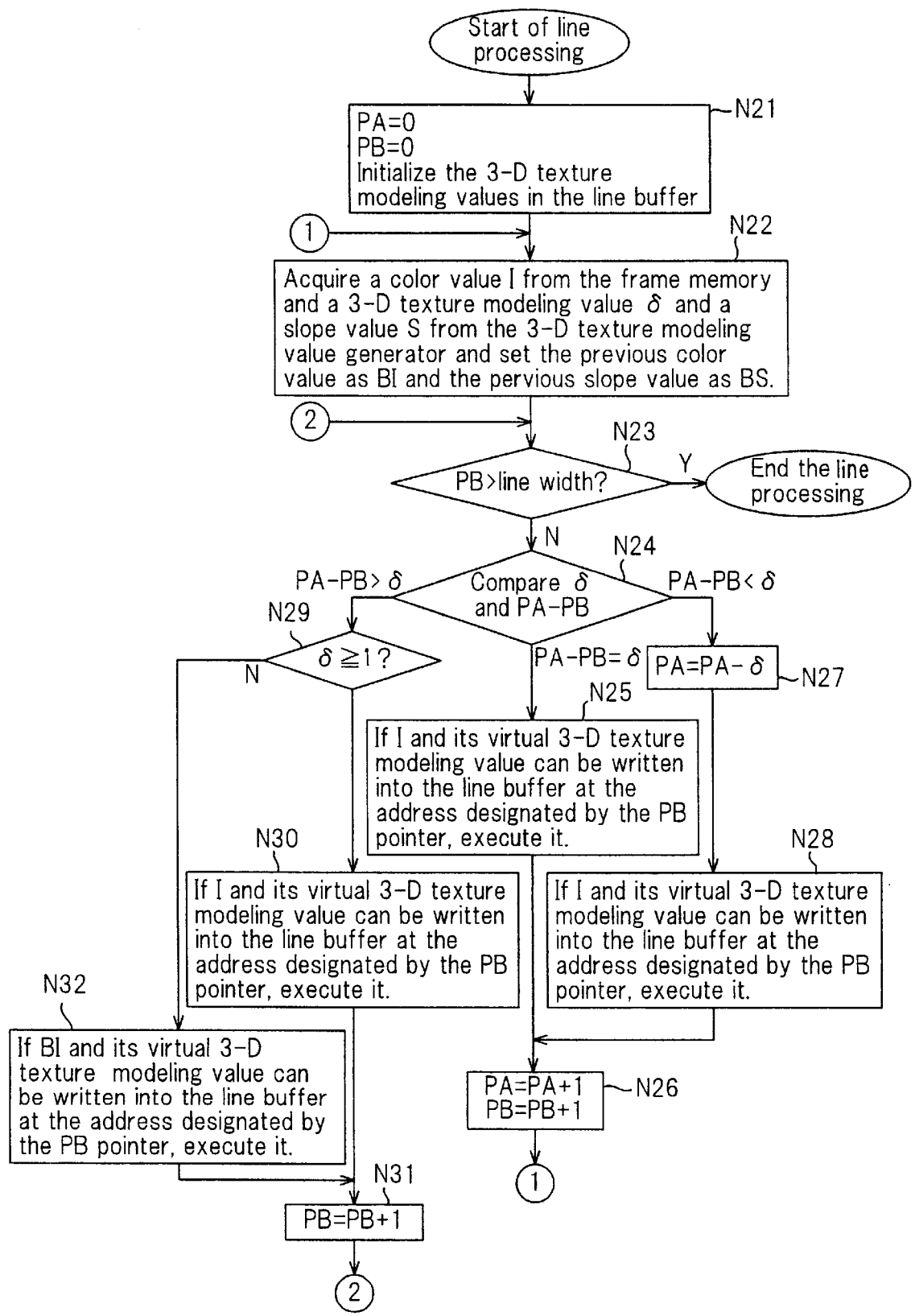

Data from the frame memory and 3-D texture modeling value generator
(Slope value S is always zero)

FIG.12A

| 0 | 0 | 0 | 2 | 0 | -1 | 0 | 0 | 1 | 1 | 0 |
|---|---|---|---|---|----|---|---|---|---|---|
| a | b | c | d | e | f  | g | h | i | j | k |

$a_1$ $b_1$ $c_1$ $d_1$ $e_1$ $f_1$ $g_1$ $h_1$ $i_1$ $j_1$ $k_1$

Data in the line buffer

FIG.12B

Virtual 3-D texture modeling value
Color value

| 0 | - | - | - | - | - | - | - | - | - | - |
|---|---|---|---|---|---|---|---|---|---|---|
| a | - | - | - | - | - | - | - | - | - | - |

| 0 | 0 | 0 | - | - | - | - | - | - | - | - |
|---|---|---|---|---|---|---|---|---|---|---|
| a | b | c | - | - | - | - | - | - | - | - |

| 0 | 2 | 0 | - | - | - | - | - | - | - | - |
|---|---|---|---|---|---|---|---|---|---|---|
| a | d | c | - | - | - | - | - | - | - | - |

| 0 | 2 | 1 | 2 | - | - | - | - | - | - | - |
|---|---|---|---|---|---|---|---|---|---|---|
| a | d | d | d | - | - | - | - | - | - | - |

| 0 | 2 | 1 | 0 | 0 | -1 | 0 | - | - | - | - |
|---|---|---|---|---|----|---|---|---|---|---|
| a | d | d | d | e | e  | g | - | - | - | - |

| 0 | 2 | 1 | 0 | 0 | -1 | 0 | 1 | 1 | 0 | 0 |
|---|---|---|---|---|----|---|---|---|---|---|
| a | d | d | d | e | e  | g | i | j | j | k |

PA=11
PB=11

$a_2$ $b_2$ $c_2$ $d_2$ $e_2$ $f_2$ $g_2$ $h_2$ $i_2$ $j_2$ $k_2$

3-D TEXTURE MAPPING PROCESSOR AND 3-D IMAGE RENDERING SYSTEM USING THE SAME

BACKGROUND OF THE INVENTION (1) Field of the Invention

The present invention generally relates to a processor for imparting a three-dimensional appearance to a texture used in computer graphics, and more particularly relates to a 3-D texture mapping processor which can render asperity on the surface of a display object as well as relating to a 3-D image rendering system using the same.

(2) Description of the Prior Art

Currently, computer graphics (CG) has been used in a variety of fields. Of the CG technologies, there is a technique called 3-dimensional graphics, for creating an image from 3-dimensional data in order to produce a more real image. The 3-D graphics are generally produced by combining a number of flat polygonal shapes, called polygons, to represent 3-D objects.

This method, however, needs a vast number of polygons in order to reproduce a CG video image of an object having fine bumps. With increase in the number of polygons, the data to be processed increases, so that the speed of rendering becomes lowered. Further, it is very difficult to perform modeling of fine bumps.

For these reasons, as the method of simulating fine bumps, texture mapping techniques or bump mapping techniques have been used.

The texture mapping technique for representing an object having patterns on its surface, is to create a more realistic image by applying actual photographic images onto polygons. There are various techniques in texture mapping, but in general, mapping is performed by applying 2-D planar images onto the surface of 3-D objects. This means that fine bumps are represented in a simulating manner by mapping texture images having small asperities represented by light and shade of an image.

On the other hand, the bump mapping technique for representing an object having fine bumps is a method by which asperities of an object will be made by mapping normal vectors to the surface of the object. This information is translated into a light and shade representation during shading so as to represent asperities in a simulating manner. This method is able to achieve a more realistic asperity representation than that of the texture mapping which used fixed lighting and shadowing.

General texture mapping techniques, simply use optical illusion in a monocular 3-D recognition. That is, the image represented is that viewed merely from a fixed point of view, therefore the image will not vary in conformity with movement such as it would when viewed with binocular vision, or when the displayed objects or the observer's point moved causing parallax due to the movement in stereoscopic vision. Further, the image will not change the light and shade of its asperities and hence will be represented as being flat.

The technique for bump mapping is to merely simulate asperities by manipulating light and shade, and therefore cannot represent warps in the texture due to the irregularities within the polygon.

To deal with the above problem, a means whereby asperities can be represented by textures in a stereoscopic vision including motion parallax, but still within a short processing time, have been disclosed in Japanese Patent Application Laid-Open Hei 6 No. 348,860 and Japanese Patent Application Laid-Open Hei 7 No. 254,072. In these methods, a multiple number of textures each of which is a pattern viewed from a different direction are stored beforehand so that optimal textures can be selected therefrom in accordance with the situation, hence reducing the perspective distortion or subjecting the textures to interpolation case by case, thus making it possible to produce a more natural image. This method, however, needs to store the textures viewed from various directions beforehand if the angle of view is unlimited, increasing the bulk of texture data stored.

Further, for example, when the edges of polygons must displace in accordance with the irregularities within the polygons as in the case where a flag is fluttering, all of the above means cannot deal with the displacement of polygons themselves, and hence cannot create a natural image. In this case, in accordance with the irregularities of the flag, further division into a greater number of polygons is needed so that each of the thus divided polygons is adapted to be texture mapped or bump mapped. Accordingly, the processed amount of data will increase, hence needing a longer processing time.

SUMMARY OF THE INVENTION

The present invention has been devised in view of the above problems, and it is therefore an object of the present invention to provide a 3-D texture mapping processor and a 3-D image rendering system using it, wherein the texture to be mapped can be warped in a simulating manner utilizing fine bumps within the polygon and hence 3-D image rendering can be performed with a lower number of polygons. To achieve the above object, the present invention is configured as follows:

In accordance with the first aspect of the invention, a three-dimensional texture mapping processing apparatus for producing a 3-D modeled texture, comprises:

a 3-D texture modeling value generating means for determining 3-D texture modeling values which indicate quantities by which pixels in the texture data are shifted from the original coordinates of the pixels existing on a polygon surface; and a 3-D texture modeling means for producing a 3-D appearance in a simulating manner from a two-dimensional image viewed in a line-of-sight direction, by shifting the displayed positions of the pixels in accordance with the 3-D texture modeling values.

In accordance with the second aspect of the invention, the three-dimensional texture mapping processing apparatus having the above first feature is characterized in that the 3-D texture modeling value generating means computes the 3-D texture modeling values based on the image data containing a line-of-sight vector, a surface normal vector, bump data and depth data.

In accordance with the third aspect of the invention, the three-dimensional texture mapping processing apparatus having the above first feature is characterized in that the 3-D texture modeling value generating means can produce a discretionary modified 3-D appearance by multiplying 3-D texture modeling values by a parameter.

In accordance with the fourth aspect of the invention, the three-dimensional texture mapping processing apparatus having the above second feature is characterized in that the 3-D texture modeling value generating means can produce a discretionary modified 3-D appearance by multiplying 3-D texture modeling values by a parameter.

In accordance with the fifth aspect of the invention, the three-dimensional texture mapping processing apparatus having the above first feature is characterized in that the 3-D texture modeling value generating means can produce a discretionary modified 3-D appearance by altering the 3-D texture modeling values based on an index table.

In accordance with the sixth aspect of the invention, the three-dimensional texture mapping processing apparatus having the above second feature is characterized in that the 3-D texture modeling value generating means can produce a discretionary modified 3-D appearance by altering the 3-D texture modeling values based on an index table.

In accordance with the seventh aspect of the invention, the three-dimensional texture mapping processing apparatus having the above first feature is characterized in that the 3-D texture modeling means, as assuming the 3-D texture modeling values to be the quantities representing variations in the position of the surface of a polygon, shifts the pixels in accordance with the 3-D texture modeling values so that the neighboring pixel or pixels in the opposite direction to the shift are pulled together.

In accordance with the eighth aspect of the invention, the three-dimensional texture mapping processing apparatus according having the above first feature is characterized in that the 3-D texture modeling means, as assuming the 3-D texture modeling values to be the quantities representing variations in the height of the surface of a polygon, shifts the pixels from their original positions in accordance with the 3-D texture modeling values and the slope value of the surface viewed from the line-of-sight direction.

In accordance with the ninth aspect of the invention, the three-dimensional texture mapping processing apparatus having the above first feature is characterized in that the 3-D modeled texture is added with shadows by bump mapping.

In accordance with the tenth aspect of the invention, the three-dimensional texture mapping processing apparatus having the above seventh feature is characterized in that the 3-D modeled texture is added with shadows by bump mapping.

In accordance with the eleventh aspect of the invention, the three-dimensional texture mapping processing apparatus having the above eighth feature is characterized in that the 3-D modeled texture is added with shadows by bump mapping.

In accordance with the twelfth aspect of the invention, a three-dimensional image rendering system comprises:

an image rendering means for generating image data representing a 3-D graphic image by texture mapping;

a frame memory storing the image data generated by the image rendering means;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels in the frame memory in accordance with the 3-D texture modeling values; and a display device for displaying the image data generated in the 3-D texture modeling means.

In accordance with the thirteenth aspect of the invention, a three-dimensional image rendering system comprises:

an image rendering means for generating image data representing a 3-D graphic image by texture mapping;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels output from the image rendering means in accordance with the 3-D texture modeling values;

a frame memory for storing the image data generated by the 3-D texture modeling means; and a display device for displaying the image data produced in the frame memory.

In accordance with the fourteenth aspect of the invention, a three-dimensional image rendering system comprises:

an image rendering means for generating image data representing a 3-D graphic image by texture mapping;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels output from the image rendering means in accordance with the 3-D texture modeling values; and a display device for displaying the image data produced through the 3-D texture modeling means.

In accordance with the first through fourteenth features of the invention, the 3-D texture modeling value generating means determines 3-D texture modeling values and the 3-D texture modeling means simulates a 3-D appearance by shifting the displayed positions of the pixels in accordance with the 3-D texture modeling values. Therefore, even if the view point and/or an object being displayed moves, the texture is 3-D modeled in accordance with the movement, thus making it possible to produce a natural image. Since the texture itself is 3-D modeled, it is possible to perform 3-D rendering with a minimum number of polygons because polygons do not need to be provided in accordance with asperities, thus achieve a shorter processing time.

In accordance with the second feature of the invention, since the 3-D texture modeling values are calculated from the image data containing a line-of-sight vector, a surface normal vector, bump data and depth values, the operation can be performed automatically without needing any setting from the user.

In accordance with the third to sixth features of the invention, the 3-D texture modeling values are adapted to be able to be arbitrarily varied. For example, a parameter and/or index table is stored in a register etc., so that the 3-D texture modeling values can be changed in the 3-D value generating means, using the variable factors as required. This configuration eliminates the necessity of point-by-point application of textures when the magnitudes of the asperities are to be varied.

In accordance with the seventh feature of the invention, the 3-D texture modeling means shifts each pixel in accordance with the 3-D texture modeling values so that the neighboring pixel or pixels located in the opposite direction to the shift are pulled together with the movement of the pixel in question. Therefore, it is possible to warp the edges of the polygon onto which the texture is mapped. As a result it is possible to obtain an effect of simulation in which, for example, a flag is fluttering at its edges. In this way, it is possible to change the shape of the polygon itself in accordance with irregularities, and hence the image processing can be performed with a lower number of polygons.

In accordance with the eighth feature of the invention, the 3-D texture modeling means performs 3-D texture modeling, by evaluating the 3-D texture modeling values and the slope value of the surface. That is, pixels are shifted from their original positions in accordance with the 3-D texture modeling values and the slope value of the surface. Therefore, a number of bumps can be represented by a single polygon, thus making it possible to reduce the processing time.

In accordance with the ninth through eleventh features of the invention, since the 3-D modeled texture is added with shadows by bump mapping, it is possible to produce a further more natural image.

In accordance with the twelfth feature of the invention, since the data of an image onto which a texture is applied is stored into the frame memory and the thus stored image data is subjected to a 3-D texture modeling process. Therefore, 3-D texture modeling can be performed from the data with hidden surfaces deleted. As a result, the 3-D rendering can be performed by processing a lower amount of data.

In accordance with the thirteen feature of the invention, a 3-D modeled image is displayed after the image data has been stored into the frame memory. Accordingly, it is possible to perform essential processing for hidden surfaces with irregularities, after the 3-D texture modeling process has been implemented.

In accordance with fourteen feature of the invention, since no frame memory is needed, it is possible to reduce the cost.

BRIEF DESCRIPTION OF THE DRAWINGS

FIGS. 4A and 4B are illustrative diagrams schematically showing a perturbation processing using a memory;

FIGS. 7A–7G are illustrative diagrams showing a specific example of a perturbation process using a memory;

FIGS. 9A–9C are illustrative diagrams schematically showing a height forming process using a memory;

FIG. 11 is a flowchart showing the flow of a height forming process;

FIGS. 12A–12G are illustrative diagrams showing a specific example of a height forming process using a memory;

DESCRIPTION OF THE PREFERRED EMBODIMENTS

The embodiments of the invention will hereinafter be described with reference to the accompanying drawings.
(The First Embodiment of a Three-dimensional Image Rendering System)

Figure 1:
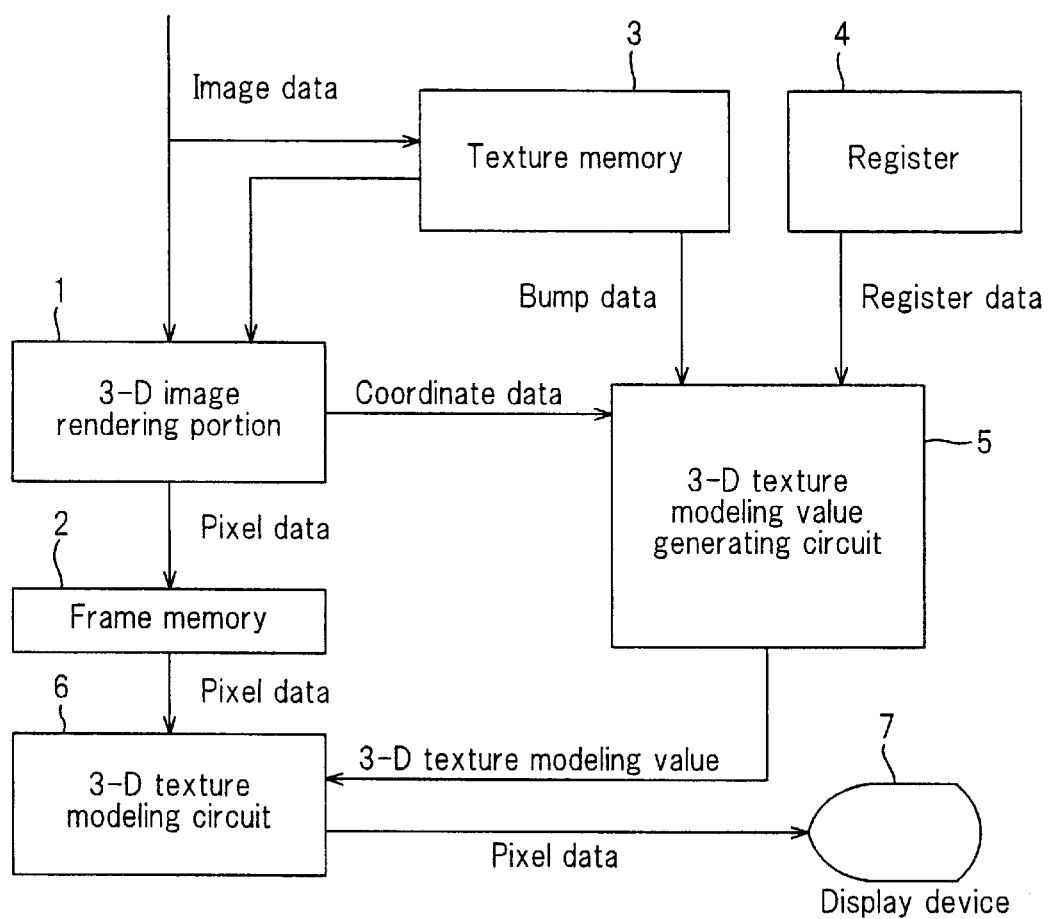
FIG. 1 is a block diagram showing the first embodiment of a three-dimensional image rendering system using a texture 3-D texture modeling device in accordance with the invention.

FIG. 1 is a block diagram showing the first embodiment of a three-dimensional image rendering system in accordance with the invention. This 3-D image rendering system includes: a 3-D image rendering portion 1; a frame memory 2; a texture memory 3; a register 4; a 3-D texture modeling value generating circuit 5; a 3-D texture modeling circuit 6; and a display unit 7.

Three-dimensional image rendering portion 1, based on image data, performs geometric transformation, projection transformation, etc. and further applies texture data from texture memory 3 onto polygons, to thereby generate graphic data of a 3-D image. This graphic data is used as the pixel data for a frame of image and written into frame memory 2. Three-dimensional modeling value generating circuit 5 performs operations on 3-D texture modeling values of asperities of the textures, using coordinate data given from 3-D image rendering portion 1, bump data stored in texture memory 6, and parameters stored in the register. These 3-D texture modeling values are provided to 3-D texture modeling circuit 6 where, based on these values, the data from frame memory 2 is formed into a 3-dimensional image, which in turn is displayed on display unit 7.

The 3-D texture modeling values are the values which are computed so as to skew the texture in a simulating manner to generate perspective, and basically, are calculated based on a line-of-sight vector data, a vector data of surface normal of a polygon surface, the Z-values as the depth values, bump data of the texture. However, it is also possible to compute them from other than these, aiming at a special effect. Examples of computations of 3-D texture modeling values will be shown next.

(1) The First 3-D Texture Modeling Value Computing Method

Figure 2:
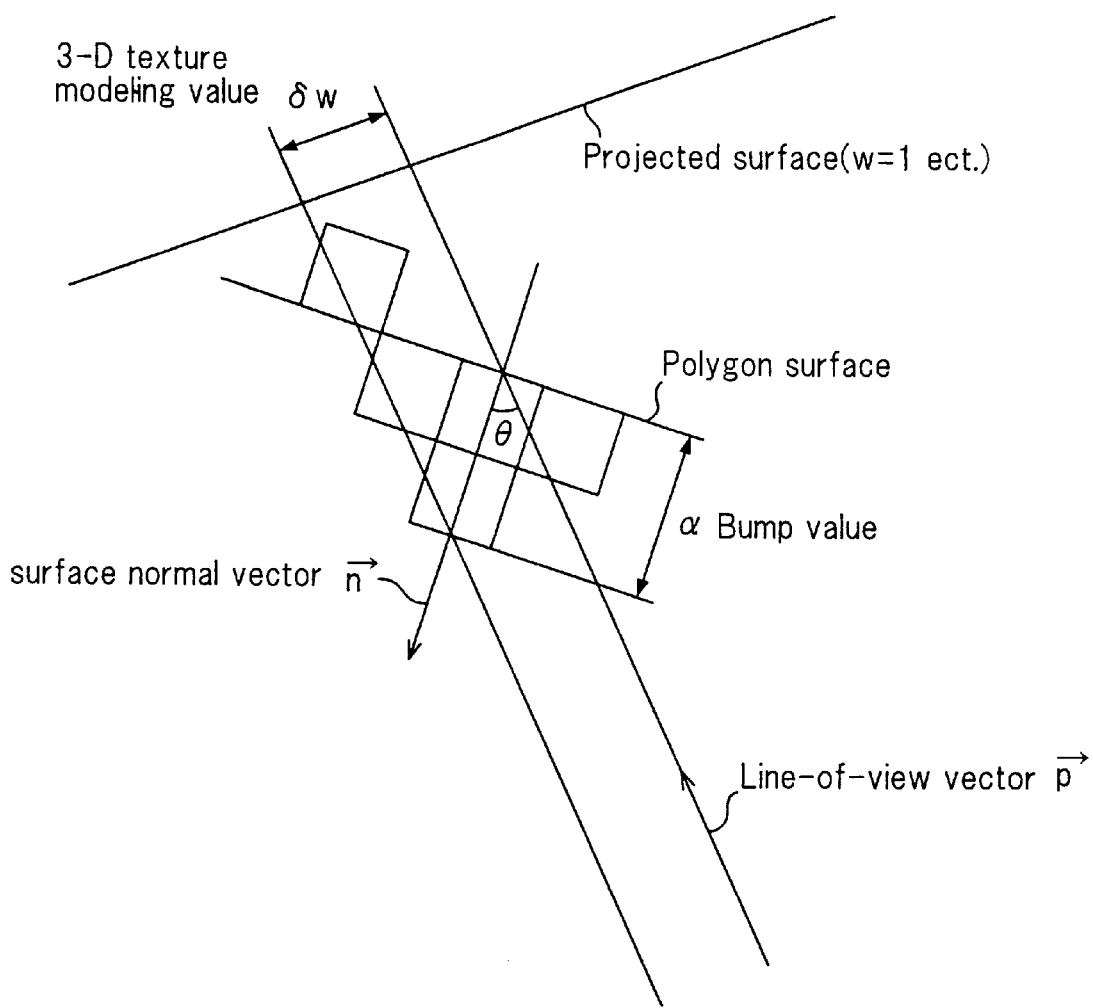
FIG. 2 is an illustrative view showing a geometrical computation for a 3-D texture modeling value.

In a world coordinate system, from a geometric viewpoint, a bump on a surface can be taken as a dot being raised (or sunken) by the bump value in the perpendicular direction from the surface onto which the texture is mapped. FIG. 2 shows this situation, where P designates the line-of-sight vector to the observed point on the surface, n the normal vector from the surface, and α the height of the bump. In this situation, as a polygon is projected onto the surface of projection from the line-of-sight direction, the texture is projected onto the surface of projection in the position corresponding to the facet of the polygon since the texture resides on the polygon facet. However, suppose that the dot is raised in the perpendicular direction by the bump value, the projected position is displaced from the position where the dot residing on the polygon facet is not projected. The displacement $\delta_w$ of the dot viewed in this line-of-sight direction can be given as:

$$\delta_w = \alpha \sin \theta = \alpha |P \times n|.$$

Further, since the distance from the viewpoint affects the displacement of the dot, the displacement $\delta$ of the dot in the screen coordinate system can be calculated from the homogenous coordinate value w. That is, the displacement $\delta_w$ of the dot is transformed into the coordinate values in the screen coordinate system from the world coordinate system, depending on the homogenous value w. The thus obtained value $\delta$ is used as the 3-D texture modeling value. The formula for this can be written as follows:

$$\delta = \alpha w |P \times n|.$$

Instead of using the homogenous coordinate value w, it is possible to approximate the displacement using the inverse of the depth value Z as the content of the Z buffer:

$$\delta = \alpha |P \times n|.$$

When this value is used as the 3-D texture modeling value, it is possible to produce an image with bumps on facets faithfully reproduced.

(2) The Second 3-D Texture Modeling Value Computing Method

Concerning the 3-D texture modeling value, the displacement value $\delta$ of a dot in the screen coordinate system may not be necessarily determined with such an exactness as the geometric computation as above. A desired operation or arbitrary manipulation can be used for determining it based on the vector of the line of sight, the vector of the surface normal, the homogenous coordinate value w, and/or the magnitude $\alpha$ of the bump.

As an example, the 3-D texture modeling value can be set as follows:

$$\delta = \alpha$$

$$\delta = w, \text{ or}$$

$$\delta = \alpha w^2 |P \times n|$$

Use of these expressions can produce various special effects on the 3-D texture.

Also, a random number may be used. For example, suppose the output from a circuit generating a random number within −1 to 1 is represented by rand, $\delta$ may be written as:

$$\delta = A \cdot \text{rand} \cdot w \text{ (}A\text{: a discretionary constant)}.$$

This configuration provides diffusing effects from fluctuation occurring in the entire frame due to the random number.

(3) The Third 3-D Texture Modeling Value Computing Method

The 3-D texture modeling value calculated by the first or second computing method, is produced from the arithmetic operation based on the image data, so that if the image data is identical, the same result is obtained every time. This means that if the image data is unchanged, the image obtained will always be identical.

Accordingly, when the magnitudes of the bumps in the 3-D texture in the image need to be changed, the magnitude $\alpha$ of the bumps in the texture must be changed. This means that another texture should be prepared so as to be applied as a replacement. This needs extra use of the texture memory.

To deal with this, the following computing method can be used. In this method, an external parameter 't' is introduced besides the image data. This will be used for the arithmetic operation of the 3-D texture modeling value as in the following manner.

$$\delta = \alpha t w |P \times n|$$

where t varies in the range of $0 \leq t \leq 1$.

With this configuration, only the change of the magnitudes of the bumps can be performed by changing the external parameter 't' only. It is also possible to readily produce a visual image in which the 3-D texture is undulating. The operation formula containing an external parameter may be given in other forms than the above one. Examples include:

$$\delta = \alpha t$$

$$\delta = \alpha w |P \times n| \cdot \sin (2\pi(t/T)).$$

Here, T is another external parameter, differing from t.

This external parameter is stored in register 4 and given to 3-D texture modeling value generating circuit 5.

(4) The Fourth 3-D Texture Modeling Value Computing Method

Similar to the third method, there is another method of altering the magnitudes of the bumps without changing the image data. This method uses indices. Specifically, the magnitude of a bump is adapted to be determined referring to a table which is related to $\alpha$ as an index. That is, the magnitude $\delta$ of the actual bump is determined as $$\delta = \text{table}(\alpha) \cdot w |P \times n|$$

where table($\alpha$) is a value in the bump table related to the bump value $\alpha$.

In this method, it is possible to vary the size of the bumps by changing the content of table($\alpha$) externally. This method is different from the third computing method in that the size of the bump having a certain a value can be varied. The third method provides the effect of undulating the 3-D texture as a whole whereas this method enables the 3-D texture in part to undulate.

It should be noted that the operation formula based on the table may be given in other forms than the above one. Examples include:

$$\delta = \alpha |P \times n| \cdot \text{table } (w)$$

$$= \text{table}(\alpha).$$

The table is stored in register 4.

Next, the method of 3-D texture modeling in 3-D texture modeling circuit 6 will be explained.

(1) The First 3-D Texture Modeling Method

Figure 3A:
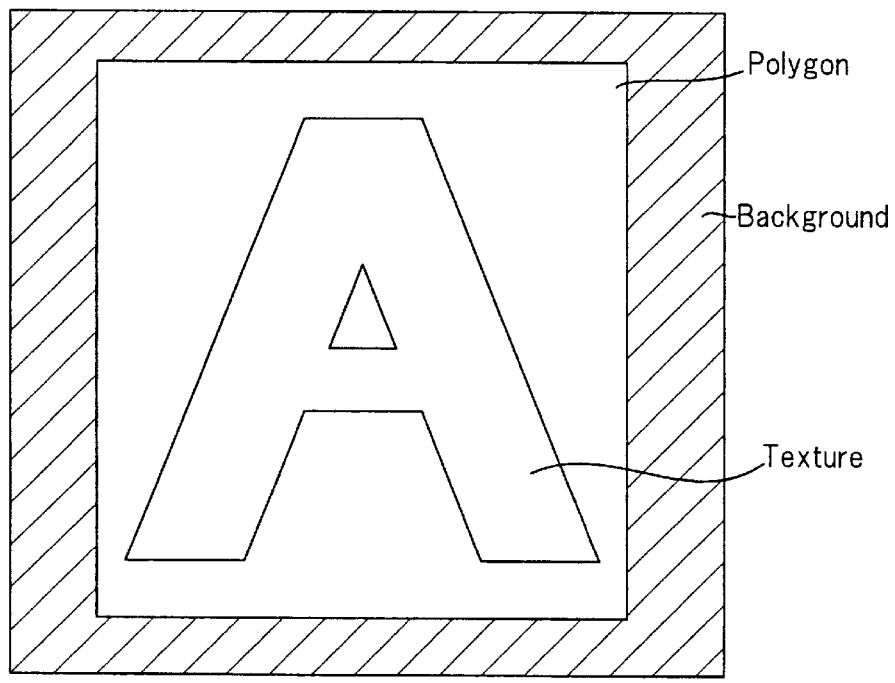
FIGS. 3A and 3B are illustrative views showing the effect of a perturbation processing.
Figure 3B:
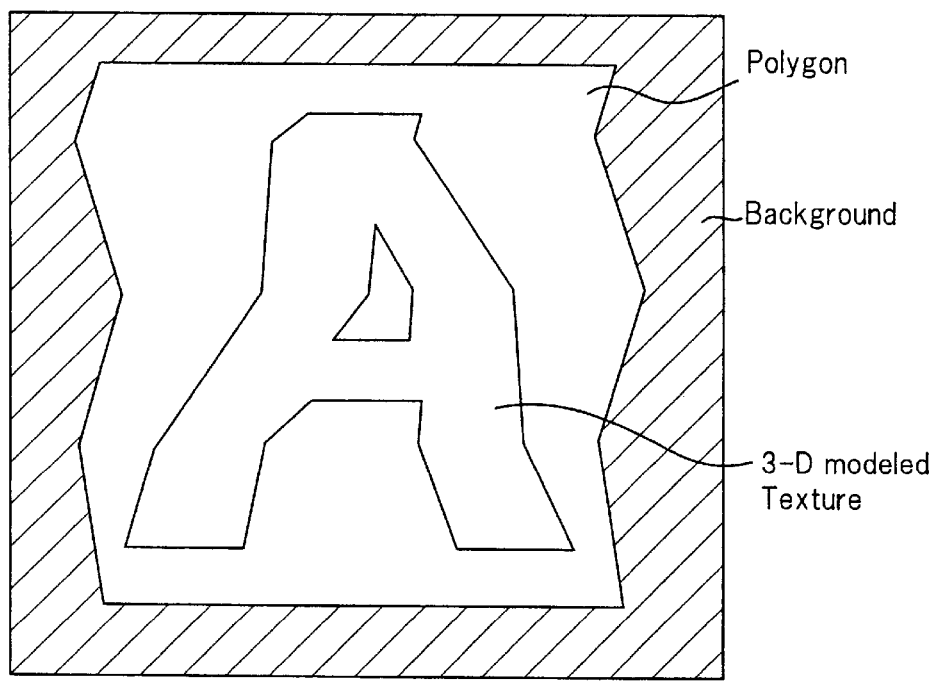

In the first 3-D texture modeling method, the 3-D texture modeling value is interpreted as perturbation of the dot so as to perturb the dot. Perturbation used here means a small shift to the left or right, that is, the magnitude of this shift is interpreted as to correspond to the 3-D texture modeling value. In the screen coordinate system, a shift of a dot to the left or right means that the surface to which the texture is mapped swells or dents, respectively. A typical case is a flag shown in FIG. 3A fluttering as shown in FIG. 3B. In order to produce an image of FIG. 3B from the polygon forming the flag shown in FIG. 3A, the edges of the polygon must be deformed at the same time when the 3-D texture is warped by the perturbation. Now, this perturbation processing will be detailed hereinbelow.

FIGS. 4A and 4B are illustrative diagrams showing the perturbation processing using a line buffer. In FIGS. 4A and 4B, each cell represents a pixel, and the number thereabove represents the 3-D texture modeling value of the pixel. The character in the cell represents its pixel data. Further, the character below the cell designates the location (address) of the pixel. FIGS. 4A and 4B illustrate the case where the data in FIG. 4A when 3-D modeled results in the data shown in FIG. 4B. In FIGS. 4A and 4B, since the 3-D texture modeling value at address $d_1$, in FIG. 4A is 2, this dot is perturbed to the location $b_2$. Accordingly, the pixel data of the dot at $e_1$ is copied to locations $c_2$ to $d_2$ with the movement of the perturbed dot. That is, when a dot is perturbed, the dot will be shifted so that the data of the neighboring dot or dots in the opposite direction to the shift are pulled together.

This operation provides a displayed image where the image around a perturbed dot is pulled or stretched. By this method, it is possible to obtain the effect of deforming the edges of the 3-D texture from the perturbation as shown in FIG. 3B when the flag shown in FIG. 3A is fluttering. This effect can be achieved because the color in the background is pulled by the polygon to which the 3-D texture is applied. Accordingly, the pixel with a 3-D texture modeling value of 1 is shifted one pixel to the left and displayed therein while the pixel with a 3-D texture modeling value of −1 is shifted one pixel to the right and displayed therein. Similarly, the pixel with a 3-D texture modeling value '2' is shifted two pixels to the left and the pixel with a 3-D texture modeling value of −2 is shifted two pixels to the right. Thus, the perturbation process of the dots will be performed.

Figure 5:
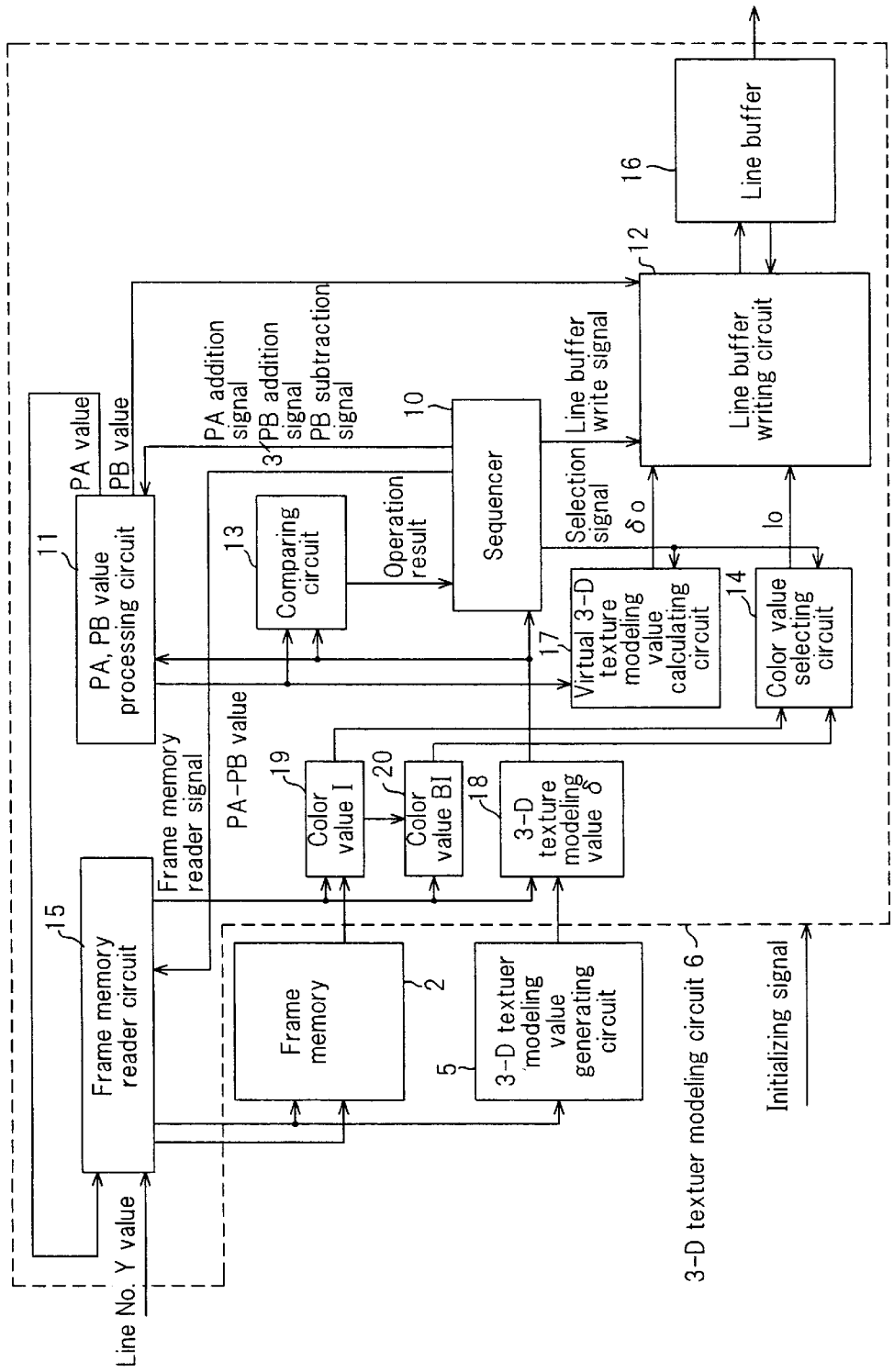
FIG. 5 is a block diagram showing a 3-D texture modeling circuit for realizing a perturbation process.

FIG. 5 is a block diagram showing a 3-D texture modeling circuit for realizing this process. This 3-D texture modeling circuit, designated at 6, includes a sequencer 10, a PA,PB value processing circuit 11, a line buffer writing circuit 12, a comparing circuit 13, a color value selecting circuit 14, a frame memory reader circuit 15, a line buffer 16, latch circuits 18–20 and a virtual 3-D texture modeling value calculating circuit 17.

Here, PA is a pointer indicating the ordinal number of the pixel of data from the right end pixel in frame memory 2 for the reading operation while PB is a pointer indicating the ordinal number of the pixel of data from the right end pixel in line buffer 16 for the writing operation. The values of PA and PB begin from 0. The reading operation from frame memory 2 is started from the address designated by PA, and the writing operation into line buffer 16 is started from the address designated by PB. The 3-D texture modeling value δ represents the 3-D texture modeling value of the pixel designated by PA and I represents its color value. Further, BI represents the luminance of the pixel residing to the right side of the pixel designated by PA. Writing into line buffer 16 is performed when the original virtual 3-D texture modeling value at the address designated by PB is smaller in absolute value than the virtual 3-D texture modeling value to be written in.

The virtual 3-D texture modeling value is the value actually perturbed. For example, the color value at address $e_1$ in FIG. 4A is perturbed to locations $c_2$–$f_2$ in FIG. 4B, the virtual 3-D texture modeling value at $c_2$ is 2, the virtual 3-D texture modeling value at $d_2$ is 1, the virtual 3-D texture modeling value at $e_2$ is 0, and the virtual 3-D texture modeling value at $f_2$ is −1. Judgment of the writing into line buffer 16 is made based on these virtual 3-D texture modeling values.

Sequencer 10, based on the comparison result between PA−PB and the 3-D texture modeling value δ from com-paring circuit 13 mentioned later, generates signals for controlling PA,PB value processing circuit 11, line buffer writing circuit 12 and frame memory reader circuit 15.

PA,PB value processing circuit 11 is the circuit for outputting PA and PB values and for performing their arithmetic operations as follows, in accordance with the instructing signal from sequencer 10:

(C1) PA=PA+1

(C2) PB=PB+1

(C3) PB=PA−δ

The calculations are performed when PA addition signal, PB addition signal and PB subtraction signal become active respectively. On the other hand, the PA−PB value is continuously calculated and output from the same circuit.

Line buffer writing circuit 12, based on the PB value output from PA,PB value processing circuit 11, calculates the address in line buffer 16 into which the color value from color value selecting circuit 14 and the virtual 3-D texture modeling value from 3-D texture modeling value calculating circuit 17 at the designated address are to be put. This writing is performed when the line buffer write-in signal from sequencer 10 is active.

Further, there are two conditions for writing into line buffer 16. That is, color value $I_0$ and virtual 3-D texture modeling value $\delta_0$ will be written in under the following conditions:

(W1) when the original virtual 3-D texture modeling value at the designated address in line buffer 16 and virtual 3-D texture modeling value to be written in are compared as to their absolute values and the value to be written in is greater than the former; and (W2) when the original virtual 3-D texture modeling value at the designated address in line buffer 16 is in the initial state.

Comparing circuit 13 compares the PA−PB value output from PA,PB value processing circuit 11 with δ-value from latch circuit 18, and provides the comparison result (>, = or <) to sequencer 10.

Color value selecting circuit 14 selects a write-in value to be written into line buffer 16, and selects either I or BI as its output based on the selection signal from sequencer 10. Here, when the selection signal is active, I will be output, and when it is negative, BI will be output.

Virtual 3-D texture modeling value calculating circuit 17 calculates the virtual 3-D texture modeling value as the magnitude of the actual perturbation of the dot to be written into line buffer 16. This circuit 17, on receiving the PA−PB value output from PA,PB value processing circuit 11 and the selection signal from sequencer 10, outputs a virtual 3-D texture modeling value, i.e., outputs PA−PB if the selection signal is active and PA−PB+1 when the selection signal is negative.

Frame memory reader circuit 15 calculates the address in frame memory 2 from which the data is to be read out, based on the PA value output from PA,PB value processing circuit 11 and the line number Y from 3-D image rendering portion 1, and reads out the color value I from the computed addressed and reads out the 3-D texture modeling value δ from 3-D texture modeling value generating circuit 5. At the same time, the previous color value is stored into BI. These values are stored into latch circuits 18–20.

Line buffer 16 is a buffer for storing virtual 3-D texture modeling value $\delta_0$ and color value $I_0$. Line buffer 16 has a double buffer configuration in which one layer of the data can be switched with the other, in response to the horizontal synchronizing signal from the display device. The content on the upper buffer is read out by the display device so as to be displayed on it. The lower buffer is used for processing of 3-D texture modeling circuit 6.

Figure 6:
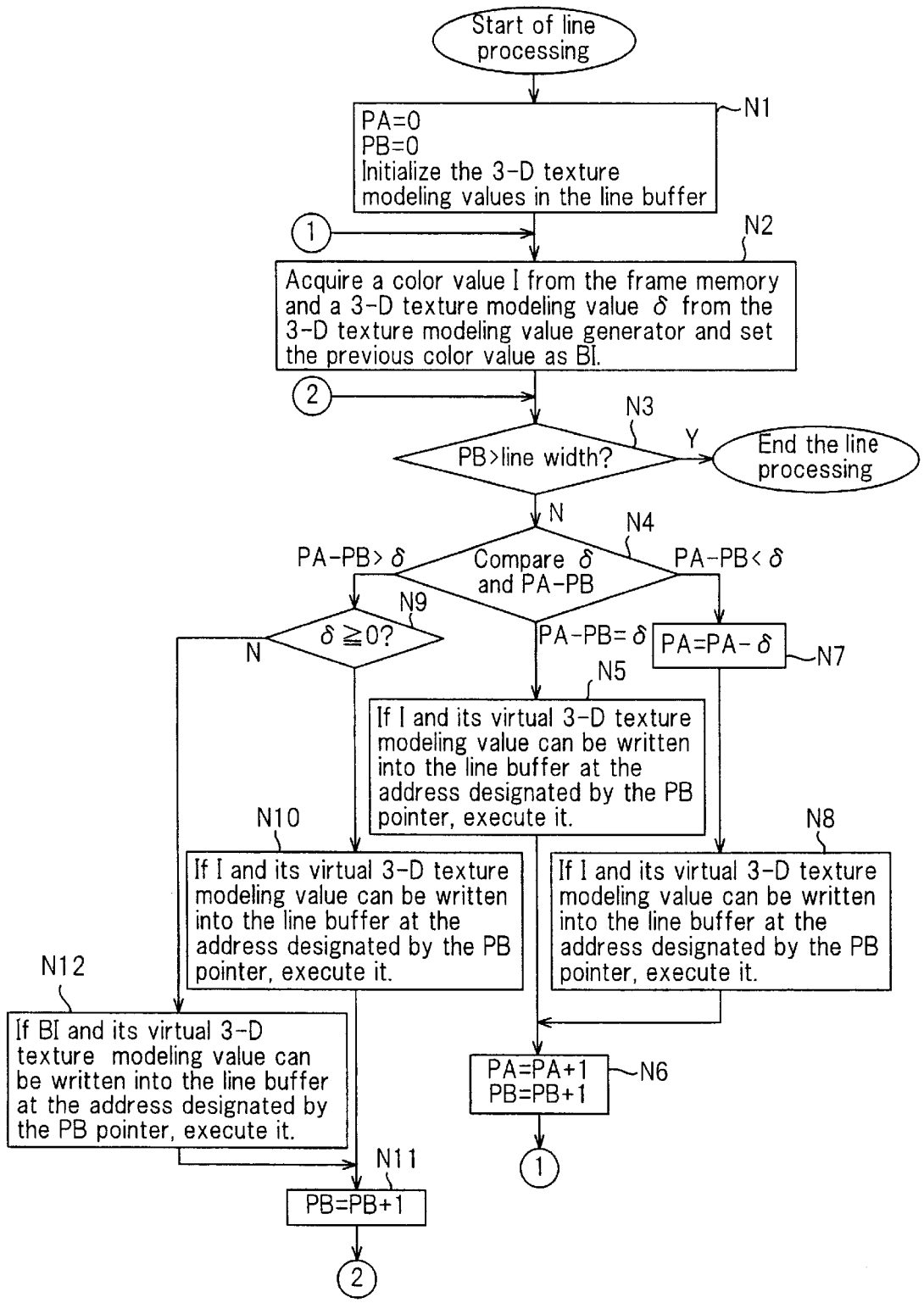
FIG. 6 is a flowchart showing the flow of a perturbation process.

Next, the operation of 3-D texture modeling circuit 6 will be explained. FIG. 6 is a flowchart showing the flow of the perturbation process in 3-D texture modeling circuit 6. This flowchart shows the case where the data is processed line-wise. The processing shown in this flowchart is an example only, and it will be obvious from the features of the hardware, that other methods of generating perturbation shown FIGS. 4A and 4B than that shown here can be easily conceived. For example, the process can be executed in a pipelining manner or in a parallel manner. Further, a method may be realized whereby the correlation between the data located before and behind the line in question is checked so as to make perturbation two-dimensional.

In the initial state, the parameters and the latched values are set so that PA=0, PB=0, latch $\delta$=0 and latch I=0, the 3-D texture modeling values in line buffer 16 are all cleared (Step N1). This initialization is made every line by the initializing signal.

FIGS. 7A–7G are illustrative charts showing an example of the perturbation processing of the data in frame memory 2 and line buffer 16. The perturbation process will be explained based on these figures. In the state where the initialization has been made, PA designates $a_1$ and PB designates $a_2$. FIG. 7A corresponds the content of frame memory 2, FIGS. 7B–7G correspond the content of line buffer 16. First, sequencer 10 makes the frame memory reader signal active, so as to load the color value I from frame memory 2 to latch circuit 19 and the 3-D texture modeling value $\delta$ from 3-D texture modeling value generating circuit 5 to latch circuit 18 (Step N2). Since the color value of the pixel at location $a_1$ is 'a' with its 3-D texture modeling value being 0, $\delta$ and I can be set to 0, and 'a', respectively, ($\delta$=0 and I=a), at this moment. Since the address location designated by PB is $a_2$, this point is judged as to be within the line width (Step N3) so that the operation goes to Step N4 where PA–PB and $\delta$ are compared in comparing circuit 13.

From the comparison result from comparing circuit 13, sequencer 10 operates as follows.

(T1) When the comparison result is 'PA–PB=$\delta$', the selection signal I is selected and the write-in signal to line buffer 16 is made active. After completion of the writing, the PB addition signal and the PA addition signal are made active. After completion of these arithmetic operations, the frame memory reader signal is made active to wait for the next comparison result.

(T2) When the comparison result is 'PA–PB<$\delta$', the selection signal I is selected and the PB subtraction signal is made active. After completion of the PB subtraction, the write-in signal to line buffer 16 is made active. After completion of the writing, the PA addition signal and PB addition signal are made active. After completion of these arithmetic operations, the frame memory reader signal is made active to wait for the next comparison result.

(T3) When the comparison result is 'PA–PB>$\delta$' and $\delta \geq 0$, the selection signal I is selected and the write-in signal to line buffer 16 is made active. After completion of the writing, the PB addition signal is made active. After completion of this arithmetic operation, the next comparison result is waited for.

(T4) When the comparison result is 'PA–PB>$\delta$' and $\delta$<0, the selection signal BI is selected and the write-in signal to line buffer 16 is made active. After completion of the writing, the PB addition signal is made active. After completion of this arithmetic operation, the next comparison result is waited for.

The term 'active' used here does not mean the lasting activation but means the temporary activation.

Now, PA–PB=0 because PA=0 and PB=0. Because $\delta$=0, the comparison result becomes 'PA–PB=$\delta$', and the operation goes to step N5, that is, sequencer 10 performs the operation of T1. Illustratively, sequencer 10 makes the selection signal active, luminance selecting circuit 14 outputs $I_0$=a and virtual 3-D texture modeling value calculating circuit 17 outputs $\delta_0$=PA–PB=0. Line buffer writing circuit 12 loads the data at address $a_2$ designated by PB so as to perform data-writing judgment. Now, since the virtual 3-D texture modeling value in line buffer 16 is the initial value, which follows the condition (W2), line buffer writing circuit 12 writes color value 'a' and virtual 3-D texture modeling value '0' to address $a_2$ designated by PB of line buffer 16 (Step N5). Thereafter, sequencer 10 makes the PB addition signal and PA addition signal active, and PA,PB value processing circuit 11 performs arithmetic operations of PB=PB+1 and PA=PA+1 (Step N6). Then, sequencer 10 makes the frame memory reader signal active and frame memory reader circuit 15 reads out a new color value with its 3-D texture modeling value from frame memory 2 and 3-D texture modeling value generating circuit 5 (Step N2). At this moment, PA designates location $b_1$ and PB designates location $b_2$ and the 3-D texture modeling of the pixel at location $a_1$ has been completed (FIG. 7B).

Next, the case where PA=3 and PB=3 after the above procedures have been repeated will be described.

In this case, PA designates location $d_1$ and PB designates location $d_2$. The latch values are: I=c, $\delta$=0 and BI=b. Sequencer 10, based on the frame memory reader signal, loads the color value I and 3-D texture modeling value $\delta$ and sets the latched value of the color value for BI. At this moment, I=d, $\delta$=2 and BI=c (FIG. 7C).

Subsequently, comparing circuit 13 compares PA–PB with $\delta$. In this case, because PA=3 and PB=3, PA–PB=0. Because $\delta$=2, the comparison result is 'PA–PB<$\delta$' (Step N4), so that sequencer 10 performs the operation of T2. Illustratively, sequencer 10 makes the PB subtraction signal active and PA,PB value processing circuit 11 performs the operation of PB=PA–$\delta$=1 (Step N7). Next, sequencer 10 makes the line buffer write-in signal active, so that line buffer writing circuit 12 performs writing into line buffer 16. At this moment, $\delta_0$=PA–PB=2 and $I_0$=d. Since the 3-D texture modeling value in line buffer 16 is 0, based on condition (W1) the color value d and 3-D texture modeling value '2' are written into line buffer 16 at address $b_2$ designated by PB. Thereafter, PB addition signal and PA addition signal are made active, so that PA,PB value processing circuit 11 performs the arithmetic operations of PB=PB+1 and PA=PA+1 (Step N6). At this point, PA designates location $e_1$ and PB designates location $c_2$ (FIG. 7D).

Continuing the description, when, in accordance with the frame memory reader signal, a new color value with its 3-D texture modeling value is loaded, then I=e, $\delta$=0 and BI=d (Step N2).

Then, comparing circuit 13 compares PA–PB with $\delta$. (Step N4). In this case, because PA=4 and PB=2, PA–PB=2. Further, because $\delta$=0, the comparison result is 'PA–PB>$\delta$'. Further, because $\delta \geq 0$ (Step N9), sequencer 10 performs the operation of T3. First, writing into the line buffer is performed. At this point, $\delta_0$=PA–PB=2 and $I_0$=e. Because of the virtual 3-D texture modeling value in line buffer 16 being zero, line buffer writing circuit 12, in accordance with the condition (W1), writes the color value 'e' and 3-D texture modeling value '2' into line buffer 16 at address $c_2$ designated by PB. Thereafter, sequencer 10 makes the PB addition signal active so that PA,PB value processing circuit 11 performs the operation of PB=PB+1 (Step N11).

At this moment, PA designates location $e_1$ and PB designates location $d_2$. Since the point designated by PB is judged as to be within the line width (Step N3), the operation goes to Step N4 where the procedures based on the comparison result from comparing circuit 13 will be performed. In this case, because PA=4 and PB=3, PA−PB=1. Because $\delta_0=0$, the comparison result is 'PA−PB>$\delta$'.

Further, because $\delta \geq 0$ (Step N9), sequencer 10 performs the operation of T3. First, line buffer writing circuit 12 performs writing into line buffer 16. In this case, $\delta_0$=PA−PB=1 and $I_0$=e. Because of the virtual 3-D texture modeling value in line buffer 16 being zero, in accordance with the condition (W1) the color value 'e' and 3-D texture modeling value '1' are written into line buffer 16 at address $d_2$ designated by PB. Thereafter, the operation goes to step N11, sequencer 10 makes the PB addition signal active so that PA,PB value processing circuit 11 performs the arithmetic operation of PB=PB+1 (FIG. 7E).

Similar procedures will be repeated until the value of PB reaches the total pixel number in one line (FIG. 7G). In this way, 3-D texture modeling circuit 6 based on the perturbation process is realized in this embodiment.

(2) The First 3-D Texture Modeling Method

In this 3-D texture modeling method, in order to produce a height, the 3-D texture modeling value is interpreted as a variable attributed to the height of the dot. In other words, the 3-D texture modeling value is interpreted as the positional displacement due to the height of the 3-D texture. The 3-D texture modeling value is interpreted as the value indicating the degree of projection, i.e., the number of pixels in the left or right direction from the original position. In this case, if the 3-D texture modeling value is positive, the pixel in question produces a leftward shadow and if it is negative the pixel produces a rightward shadow.

It should be noted that the slope value of the surface is of importance. This is because the 3-D texture modeling value of a pixel which produces a projection can be different depending upon the slope value of the surface when viewed from the view-point. If the surface is angled with its right side, as viewed from the view-point, deeper, a pixel which has a 3-D texture modeling value rightward forms a convex dot, producing a projection to the right. A pixel which has a 3-D texture modeling value leftward forms a concave dot, so that color value of the pixel on the right side, is shown. On the other hand, on a surface which is angled with its left side, as viewed from the view point, deeper, a pixel which has a 3-D texture modeling value rightward forms a concave dot, so that the color value of the pixel on the left side is shown. A pixel having a 3-D texture modeling value leftward forms a convex dot, producing a projection leftward.

Accordingly, in this method, it is necessary to know the slope value of the surface based on which each pixel is formed. This means an extra circuit is needed for this purpose. This value, however, can be generated by 3-D texture modeling value generating circuit 5 and can be assumed as a type of 3-D texture modeling value. Therefore, in the method of the invention, instead of adding an extra circuit for calculating the slope value of the surface explicitly, the calculation is performed by 3-D texture modeling value generating circuit 5. Further discussion herein will be continued on the premise that the slope value S of the surface is assumed to be a type of 3-D texture modeling value and hence it can be obtained, in a similar manner, as a 3-D texture modeling value from 3-D texture modeling value generating circuit 5. Here, 3-D texture modeling value $\delta$ and the slope value S of the surface should be understood to be distinct.

Figure 8A:
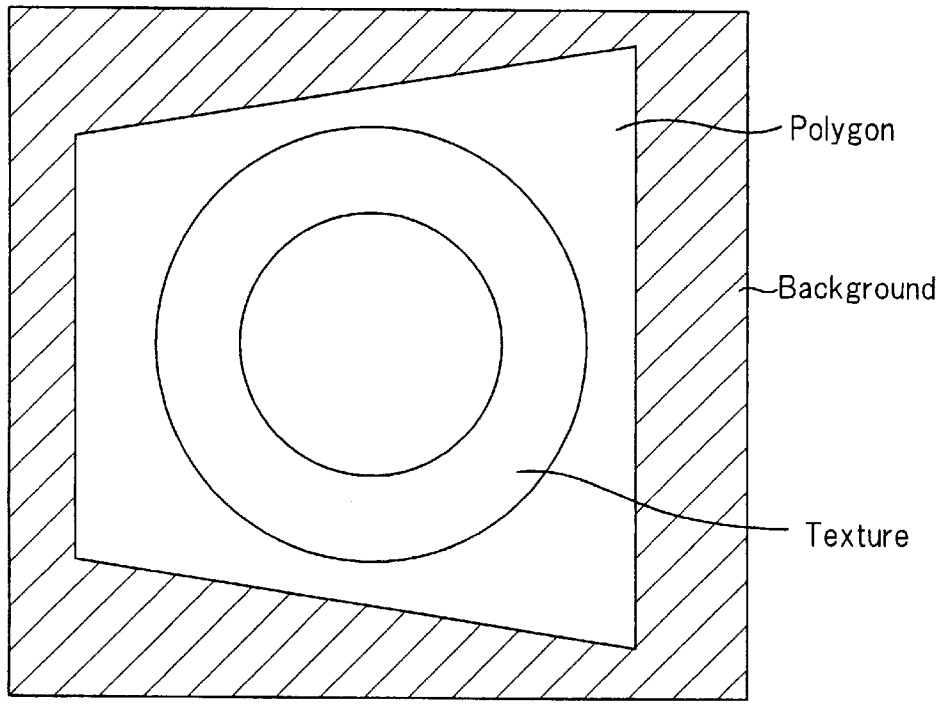
FIGS. 8A and 8B are illustrative views showing the effect of a height forming process.
Figure 8B:
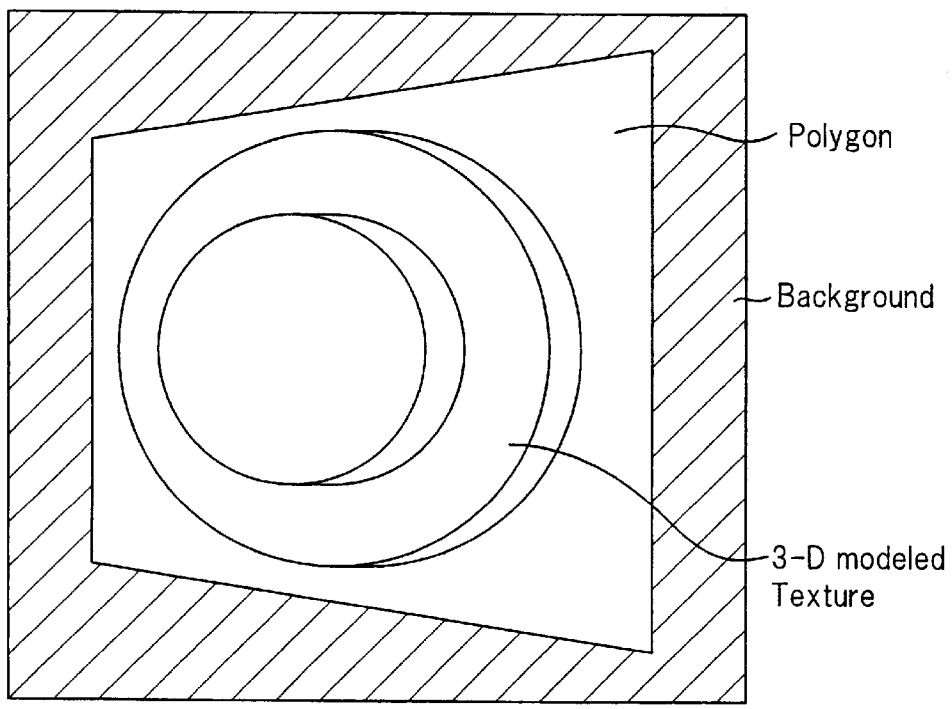

FIGS. 8A and 8B show an example of this height forming process. FIGS. 8A and 8B show a case in which a texture of concentric circles is applied to a polygon, and the circle closer to the center has greater 3-D texture modeling values. The depiction of FIG. 8A is lacking in three-dimensional sensation, being flat. Using the method of this embodiment, this figure is represented as shown in FIG. 8B in which a perspective texture can be produced by height forming process.

FIGS. 9A–9C are illustrative diagrams for explaining the height forming process using a line buffer 16. In FIGS. 9A–9C, each cell represents a pixel, and the number thereabove represents the 3-D texture modeling value of the pixel. The value inside each cell represents the color value of the pixel. Concerning FIGS. 9A–9C, FIG. 9C shows a case where the data shown in FIG. 9A is height-formed when a surface S as a whole has a slope value of the surface oriented rightward while FIG. 9B shows a case where the same data is height-formed when the surface as a whole has a slope value of the surface oriented leftward. In FIGS. 9A–9C, when the slope value of the surface is as a whole oriented rightward, the dot at location $d_1$ in FIG. 9A is projected to locations $b_2$–$d_2$ because this pixel has a 3-D texture modeling value '2'. When two neighboring pixels have the same 3-D texture modeling value as with the pixels $i_1$ and $j_1$, the projection of pixel $j_1$ overlaps the projection of pixel $i_1$, hence appearing to reveal itself (the projection of pixel $j_1$) more. This is because both the 3-D texture modeling values of pixels $i_1$ and $j_1$ are positive, and the projection of pixel $i_1$ is masked by the projection of pixel $j_1$. In this way, it is possible to produce an effect which makes the projection appear greater by the height of the dot, thus making it possible to represent the texture as if it were three-dimensional.

Figure 10:
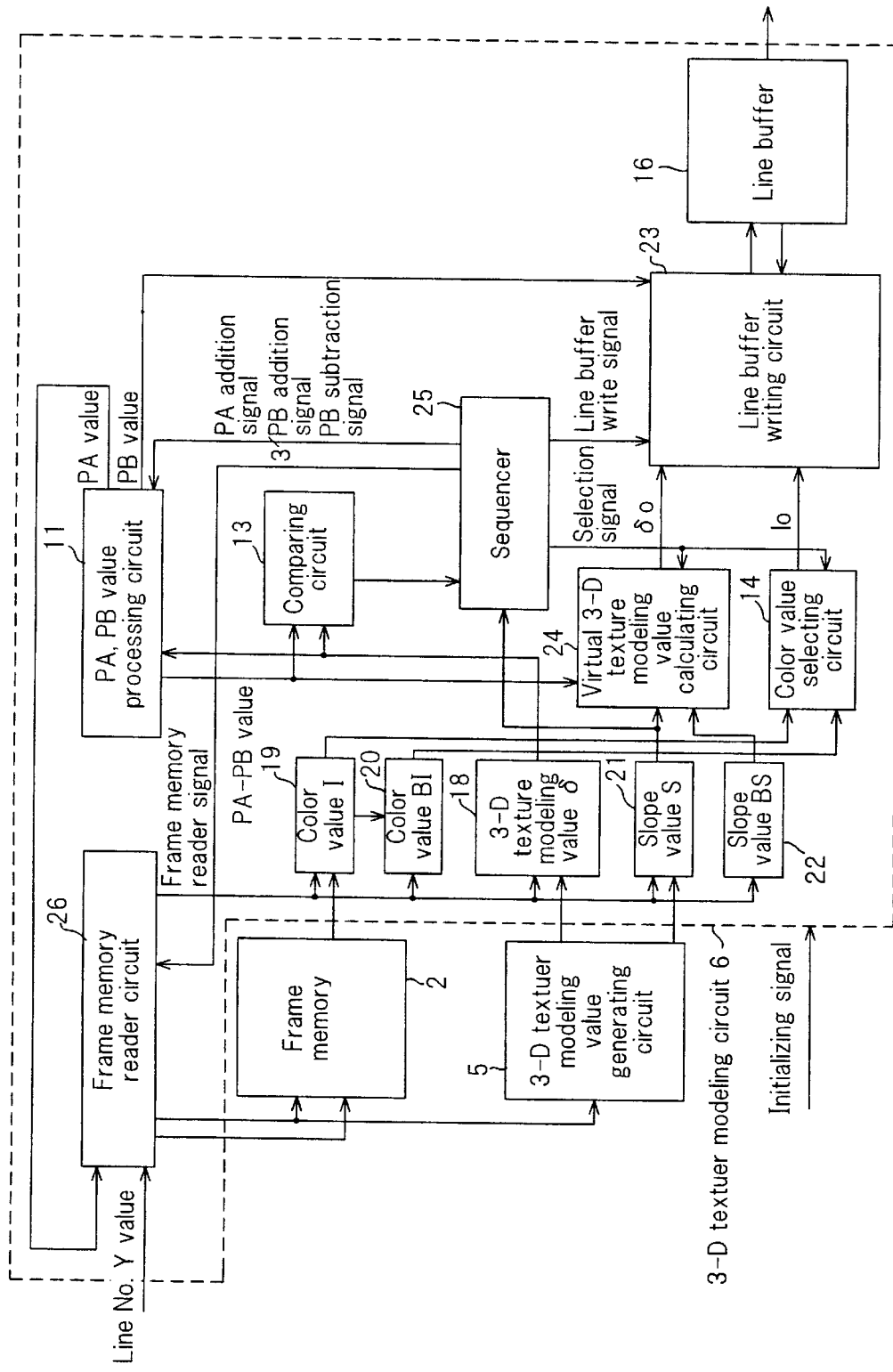
FIG. 10 is a block diagram showing a 3-D texture modeling circuit for realizing a height forming process.

FIG. 10 is a block diagram showing a 3-D texture modeling circuit for realizing the second 3-D texture modeling method in accordance with the invention. The 3-D texture modeling circuit, designated at 6, includes a sequencer 25, a PA,PB value processing circuit 11, a line buffer writing circuit 23, a comparing circuit 13, a color value selecting circuit 14, a frame memory reader circuit 15, a line buffer 16, latch circuits 18–22 and a virtual 3-D texture modeling value calculating circuit 24. This 3-D texture modeling circuit is almost the same as the 3-D texture modeling circuit 6 for realizing the first 3-D texture modeling method, and the same components are designated at the same reference numerals so that the description will be omitted.

Sequencer 25 is a sequencer which executes the branching operations in the flowchart, and generates, based on the comparison result from comparing circuit 13, the signals for controlling PA,PB value processing circuit 11, line buffer writing circuit 23 and frame memory reader circuit 26.

Sequencer 25 performs the following operations based on the comparison result.

(T11) When the comparison result is 'PA−PB=$\delta$', the luminance selection signal I is selected and the write-in signal to line buffer 16 is made active. After completion of the writing, the PB addition signal and PA addition signal are made active. After completion of these arithmetic operations, the frame memory reader signal is made active to wait for the next comparison result.

(T12) When the comparison result is 'PA−PB<$\delta$', the selection signal I is selected and the PB subtraction signal is made active. After completion of the PB subtraction, the write-in signal to line buffer 16 is made active. After completion of the writing, the PA addition signal and PB addition signal are made active. After completion of these arithmetic operations, the frame memory reader signal is made active to wait for the next comparison result.

(T13) When the comparison result is 'PA−PB>δ' and S=0 (the surface is angled with its right side deeper), the selection signal BI is selected and the write-in signal to line buffer 16 is made active. After completion of the writing, the PB addition signal is made active. After completion of this arithmetic operation, the next comparison result is waited for.

(T14) When the comparison result is 'PA−PB>δ' and S=1 (the surface is angled with its left side deeper), the selection signal I is selected and the write-in signal to line buffer 16 is made active. After completion of the writing, the PB addition signal is made active. After completion of this arithmetic operation, the next comparison result is waited for.

The term 'active' used here does not mean a lasting activation but means a temporary activation.

Line buffer writing circuit 23 calculates the address in line buffer 16 at which the data is to be written in based on the PB value output from PA,PB value processing circuit 11, and writes the color value from color value selecting circuit 14 and the virtual 3-D texture modeling value from virtual 3-D texture modeling value calculating circuit 24 into line buffer 16 at the designated address.

There are two conditions for writing into line buffer 16. That is, color value $I_0$ and virtual 3-D texture modeling value $δ_0$ will be written in under the following conditions:

(W11) when the original virtual 3-D texture modeling value at the designated address in line buffer 16 and virtual 3-D texture modeling value to be written in are compared and the value to be written in is greater than the former value; and (W12) when the original virtual 3-D texture modeling value at the designated address in line buffer 16 is in the initial state.

Virtual 3-D texture modeling value calculating circuit 24 calculates the virtual 3-D texture modeling value as the simulated height of a dot to be written into line buffer 16. Specifically, this circuit, receiving the PA−PB value, the selection signal, S-value and BS-value, outputs a virtual 3-D texture modeling value as follows:

(J1) when the selection signal is active,
   with S=0, then PA−PB,
   with S=1, then −(PA−PB)
(J2) when the selection signal is negative,
   with SB=0, then PA−PB+1,
   with BS=1, then −(PA−PB+1).

Frame memory reader circuit 26 calculates the address in frame memory 2 from which the data is to be read out, based on the PA value output from PA,PB value processing circuit 11 and the line number Y from 3-D image rendering portion 1, and reads out the 3-D texture modeling value δ, the color value I and the slope value S of the surface, from the computed address. As the same time, the previous color value is stored into BI and the previous slope value of the surface is stored into BS. These values are stored into latch circuits 18–22.

FIG. 11 is a flowchart showing the flow of the height forming process in this 3-D texture modeling circuit 6. The translations of the dots due to the height forming process will hereinbelow be explained as a variation of the height.

This flowchart shows the case where the data is processed line-wise. The process shown in this flowchart is an example only, and it will be obvious from the features of the hardware, that other methods of producing height variations shown FIGS. 9A–9C than that shown here can be easily conceived. For example, the process can be executed in a pipelining manner or in a parallel manner. Further, a method can be used whereby the data located before and behind the line in question be included for height forming process.

Writing to line buffer 16 is performed when the original virtual 3-D texture modeling value at the address designated by PB is smaller than the virtual 3-D texture modeling value to be written in. The virtual 3-D texture modeling value is a value indicating a pseudo-height: if, for example, the luminance at address $e_2$ in FIG. 9C is shifted to addresses $b_2$–$d_2$, the 3-D texture modeling value will be 3 for $b_2$, 2 for $c_2$ and 1 for $d_2$, respectively.

FIG. 11 is a flowchart showing the height forming process. First, in the initial stage, PA=0, PB=0, latchδ=0, latch I=0 and latch S=0, all the 3-D texture modeling values in the line buffer are cleared (Step N21). This initialization is made every line by the initializing signal.

FIGS. 12A–12G are illustrative charts showing an example of the height forming process of the data in frame memory 2 and line buffer 16. The height forming process will be explained based on these figures. In this sequence, PA designates address $a_1$ and PB designates address $a_2$. FIG. 12A corresponds the content of frame memory 2, FIGS. 12B–12G correspond the content of line buffer 16. In this description, the whole surface including all the pixel is angled with the right side deeper. Therefore, the slope value S of the surface will be always equal to 0, i.e., S=0.

First, sequencer 25 makes the frame memory reader signal active, so as to load the 3-D texture modeling value δ, the color value I and the slope value S of the surface, from frame memory 2 and 3-D texture modeling value generating circuit 5 into latch circuits 18, 21 and 22. The initial color value is 'a' with its 3-D texture modeling value being 0 and slope value of the surface being 0, then I=a, δ=0 and S=0 (Step N22).

Since the address location designated by PB is $a_2$, this point is judged as to be within the line width (Step N23) so that the operation goes to Step N24 where PA−PB and δ are compared in comparing circuit 13. In this case, because PA=0, PB=0, PA−PB=0. Because δ=0, the comparison result is 'PA−PB=δ'. Therefore, sequencer 25 performs the operation of (T11). Since the selection signal is active, color value selecting circuit 14 outputs $I_0$=a and virtual 3-D texture modeling value calculating circuit 24 outputs $δ_0$=PA−PB=0. Line buffer writing circuit 23 reads out the data from address $a_2$ designated by PB and makes a writing judgment. In this situation, the virtual 3-D texture modeling value in line buffer 16 is initialized, color value 'a' and virtual 3-D texture modeling value 0 are written into line buffer 16, at address $a_2$ designated by PB, following the condition (W12). Thereafter, sequencer 25 makes the PB addition signal and PA addition signal active so as to perform arithmetic operations of PB=PB+1 and PA=PA+1. Then sequencer 25 makes the frame memory read reader signal active and reads out a new color value and 3-D texture modeling value, based on the frame memory reader signal (Step N22). At this point, PA designates address $b_1$ and PB designates address $b_2$ and the 3-D texture modeling of the pixel at address 'a' has been completed (FIG. 12B).

Next, the case where PA=3 and PB=3 after the above procedures have been repeated will be shown.

In this case, PA designates location $d_1$ and PB designates location $d_2$. The latched values at latch circuits 18–22 are: I=c, δ=0, BI=b, S=0 and BS=0. Sequencer 25, based on the frame memory reader signal, loads the color value I, 3-D texture modeling value δ and the slope value S of the surface, and sets the latched value of the color value for BI (Step N22). The latched value of the slope value of the surface is set for BS. At this moment, I=d, δ=2 and BI=c, S=0 and BS=0 (FIG. 12C).

Subsequently, comparing circuit 13 compares PA−PB with δ. In this case, because PA=3 and PB=3, PA−PB=0. Because δ=2, the comparison result is 'PA−PB<δ', so that sequencer 25 performs the operation of (T12). Illustratively, sequencer 25 makes the PB subtraction signal active so that the arithmetic operation of PB=PA−δ=1 is performed. Next, sequencer 25 makes the line buffer write-in signal active, so that line buffer writing circuit 23 performs the writing into line buffer 16. At this moment, $\delta_0$=PA−PB=2 and $I_0$=d. Since the 3-D texture modeling value in line buffer 16 is 0, based on condition (W1) the color value d and 3-D texture modeling value '2' are written into line buffer 16 at address $b_2$ designated by PB. Thereafter, PB addition signal and PA addition signal are made active, so that PA,PB value processing circuit 11 performs the arithmetic operations of PB=PB+1 and PA=PA+1 (Step N26).

At this time, PA designates location $e_1$ and PB designates location $c_2$ (FIG. 12D). Continuing the description, next, sequencer 25 makes the frame memory reader signal active, so as to read out a new color value with its 3-D texture modeling value, I=e, δ=0, BI=d S=0 and BS=0 (Step N22).

Then, comparing circuit 13 compares PA−PB with δ. (Step N24). In this case, because PA=4 and PB=2, PA−PB=2. Further, because δ=0, the comparison result is 'PA−PB>δ'. Further, because δ=0 (Step N29), sequencer 25 performs the operation of (S13). First, writing into the line buffer is performed. At this point, $\delta_0$=PA−PB=2 and $I_0$=BI=d. Because of the virtual 3-D texture modeling value in line buffer 16 being zero, following the condition (W1), the color value 'd' and 3-D texture modeling value '2' are written into line buffer 16 at address $c_2$ designated by PB (Step N30). Thereafter, sequencer 25 makes the PB addition signal active so that PA,PB value processing circuit 11 performs the arithmetic operation of PB=PB+1 (Step N31). At this moment, PA designates location $e_1$ and PB designates location $d_2$.

Next, sequencer 25 directly performs the process in accordance with the comparison result. At this point, because PA=4 and PB=3, PA−PB=1. Because of δ=0, the comparison result is 'PA−PB>δ'. Further, because δ=0 (Step N29), sequencer 25 performs the operation of (T13). First, writing into the line buffer is performed. In this case, $\delta_0$=PA−PB=1 and $I_0$=BS=d. Because of the virtual 3-D texture modeling value in line buffer 16 being zero, in accordance with the condition (W1) the color value 'd' and 3-D texture modeling value '1' are written into line buffer 16 at address $d_2$ designated by PB. Thereafter, in response to the PB addition signal, PB=PB+1 is performed (FIG. 12E). Similar procedures will be repeated until the value of PB reaches the total pixel number in one line (FIG. 12G). In this way, 3-D texture modeling circuit 6 based on the height forming process is realized in this embodiment.

In this height forming process, it is possible to obtain further more realistic 3-D image by adding shadows. The example of adding shadows is described hereinbelow. When the surface is angled with its right side deeper (S=0), the height formed result will be as shown in FIG. 12G. The shadows can easily be produced based on the thus obtained data in line buffer 16.

Illustratively, the virtual 3-D texture modeling value data shown in FIG. 12G is referenced from the right to the left, and when the virtual 3-D texture modeling value is smaller than the previous one, the color value corresponding to the address is altered (mostly made darker) so as to produce shadow. When the surface in question is angled with its left side deeper (S=1), the virtual 3-D texture modeling value data is referenced from the left in a similar manner, and when the virtual 3-D texture modeling value is smaller than the pervious one, the color value corresponding to the address is altered so as to achieve shadowing.

Figure 13:
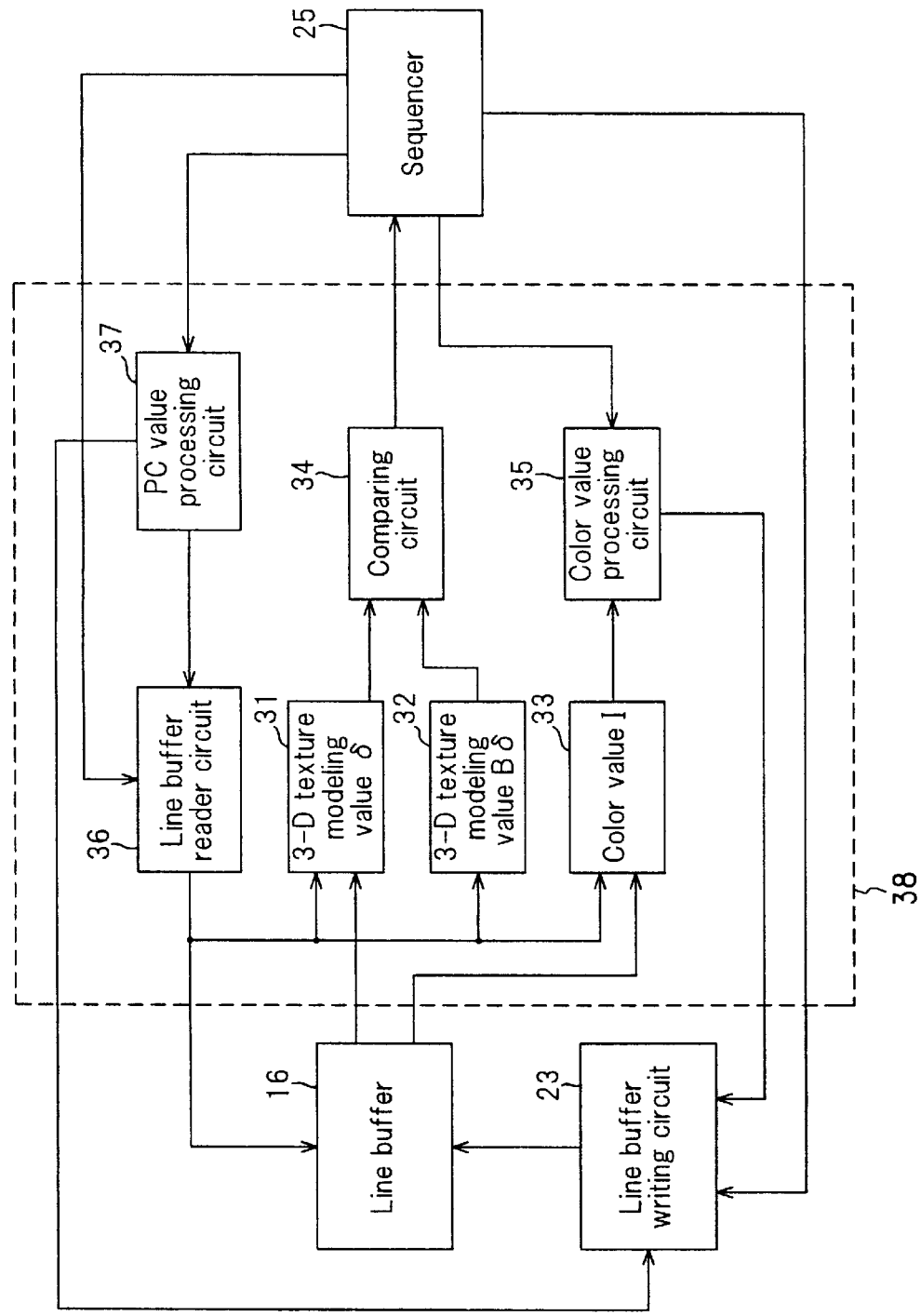
FIG. 13 is a block diagram showing a shadow adding section.

FIG. 13 is a block diagram showing this shadow adding section. This shadow adding section 38 comprises latch circuits 31–33, a comparing circuit 34, a color value processing circuit 35, a line buffer reading circuit 36 and a PC value processing circuit 37. From the data in line buffer 16, latch circuit 31 loads the 3-D texture modeling value δ and holds it, latch circuit 32 loads the previous 3-D texture modeling value Bδ and holds it and latch circuit 33 loads color value I and holds it. Comparing circuit 34 compares δ and Bδ. Color value processing circuit 35 produces an appropriately altered value from the color value I. PC value processing circuit 37 performs the arithmetic operation of PC+1 so as to set the pointer to the next address. PC is the pointer indicating the ordinal number of the pixel of data from the end pixel in line buffer 16. Line buffer reading circuit 36 reads out the data stored in the line buffer at the address designated by the PC value.

Figure 14:
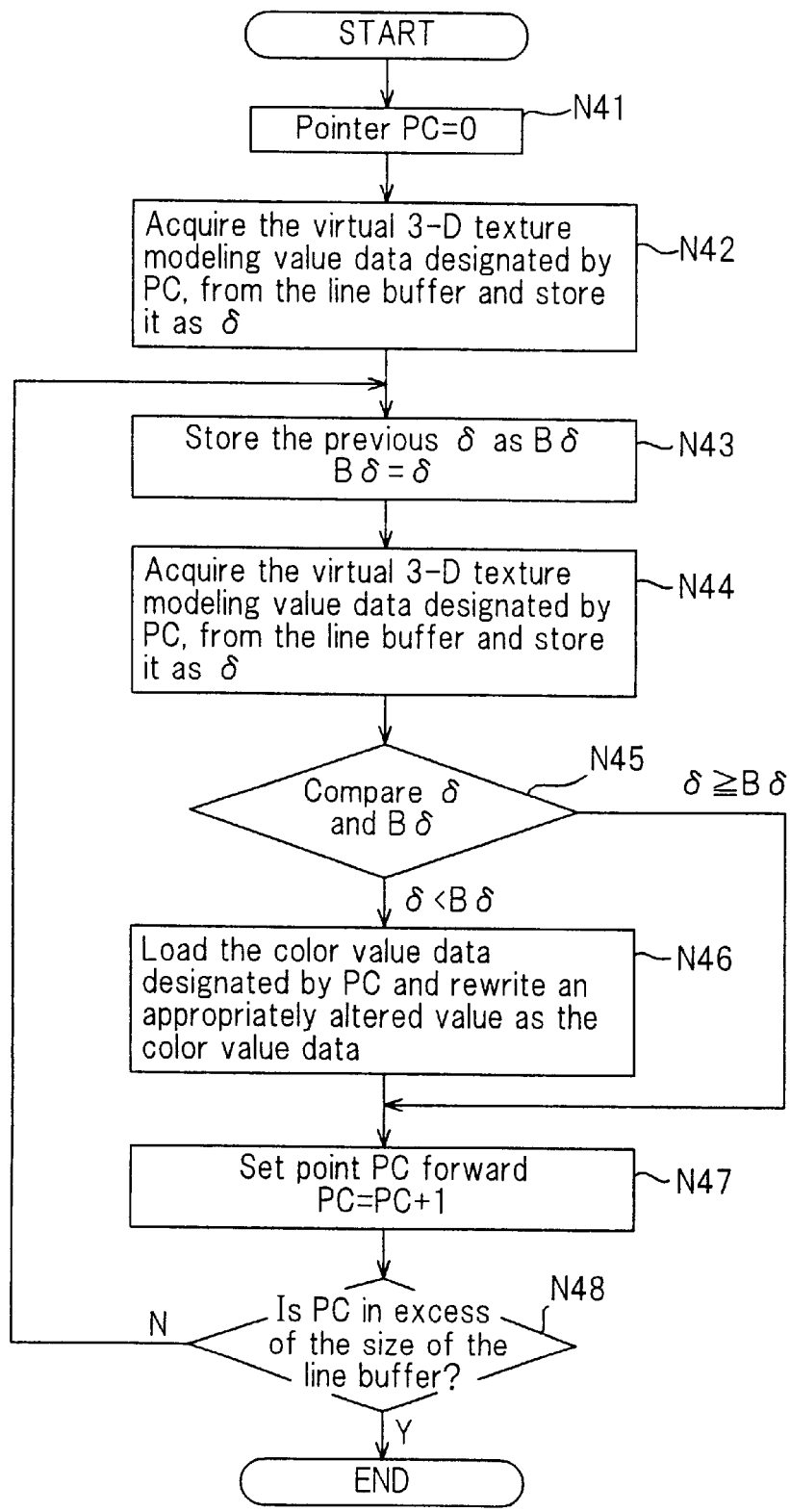
FIG. 14 is a flowchart showing the flow of a shadow adding process during height forming process.

FIG. 14 is a flowchart showing the process flow of adding shadows during the height forming process. In this figure, PC is a pointer indicating the ordinal number of the pixel of data from the right end pixel in the line buffer. This value begins from 0. Initially, pointer PC is set to 0 (Step N41). Sequencer 25 causes line buffer reading circuit 36 to read out the real 3-D texture modeling value data at the address designated by PC, from line buffer 16. The thus read out data is stored as the 3-D texture modeling value δ into latch circuit 31 (Step N42). At the same time, this δ value is stored as Bδ into latch circuit 32 (Step N43). Further, the virtual 3-D texture modeling value data designated by PC is acquired from the line buffer and is stored as a δ value into latch circuit 31 (Step N44). Comparing circuit 34 compares δ and Bδ (Step N45). In this case, if δ=Bδ, the operation goes to N47, where sequencer 25 causes PC value processing circuit 37 to perform the arithmetic operation of PC+1, to set the pointer PC forward. It is judged at step N48 whether the PC value exceeds the size of line buffer 16. If the judgment is affirmative, the operation is ended. If the judgment is negative, the operation returns to Step N43 for a similar process. If it is determined in comparing circuit 34 that δ<Bδ (Step N45), sequencer 25 causes line buffer reading circuit 36 to read the luminance data from line buffer 16 so that the data is held in latch circuit 33. The thus latched luminance is altered appropriately through color value processing circuit 35 (Step N46). Thus produced data is written into the line buffer at the address designated by PC through line buffer writing circuit 23. Thereafter, the aforementioned steps N47 and N48 are executed. When δ>Bδ, the same process is implemented as that when δ=Bδ.

(The Second Embodiment of a Three-dimensional Image Rendering System)

Figure 15:
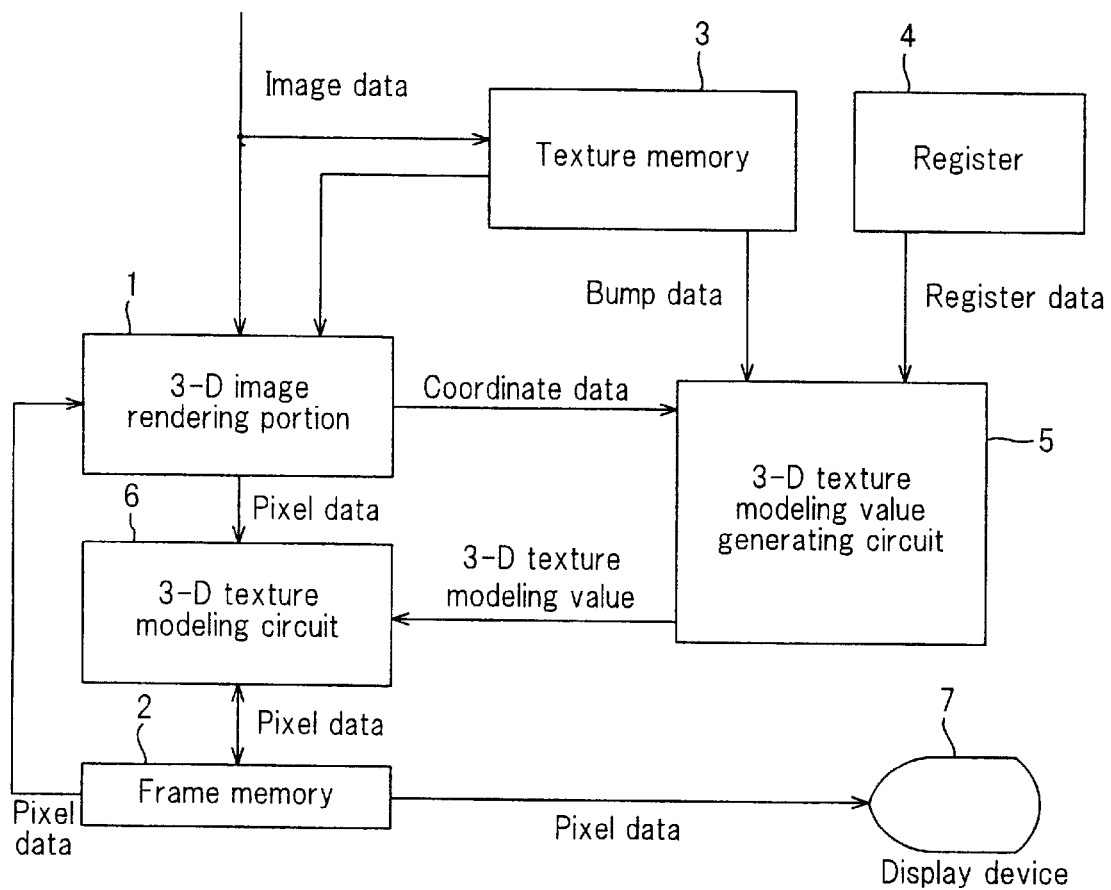
FIG. 15 is a block diagram showing the second embodiment of a three-dimensional image rendering system using a texture 3-D texture modeling device in accordance with the invention.

FIG. 15 is a block diagram showing the second embodiment of a three-dimensional image rendering system. This image rendering system has almost the same configuration as that of the previous one. The difference is that 3-D texture modeling circuit 6 is interposed between 3-D image rendering portion 1 and frame memory 2 so that the data is 3-D modeled when written into frame memory 2.

The difference from the image rendering system shown in FIG. 1 will be explained. Since, in this image rendering system, the data which may be hidden and erased is also 3-D modeled, this configuration is at a disadvantage in that a large amount of data should be processed, and hence the speed of rendering lowers. However, this image rendering system is not inferior in all aspects. There is an advantage in that it is impossible for the image rendering system shown in FIG. 1 to perform the process of generating hidden surfaces with their asperities after 3-D rendering, has been performed, but this can be done by the image rendering system of this embodiment.

(The Third Embodiment of a Three-dimensional Image Rendering System)

Figure 16:
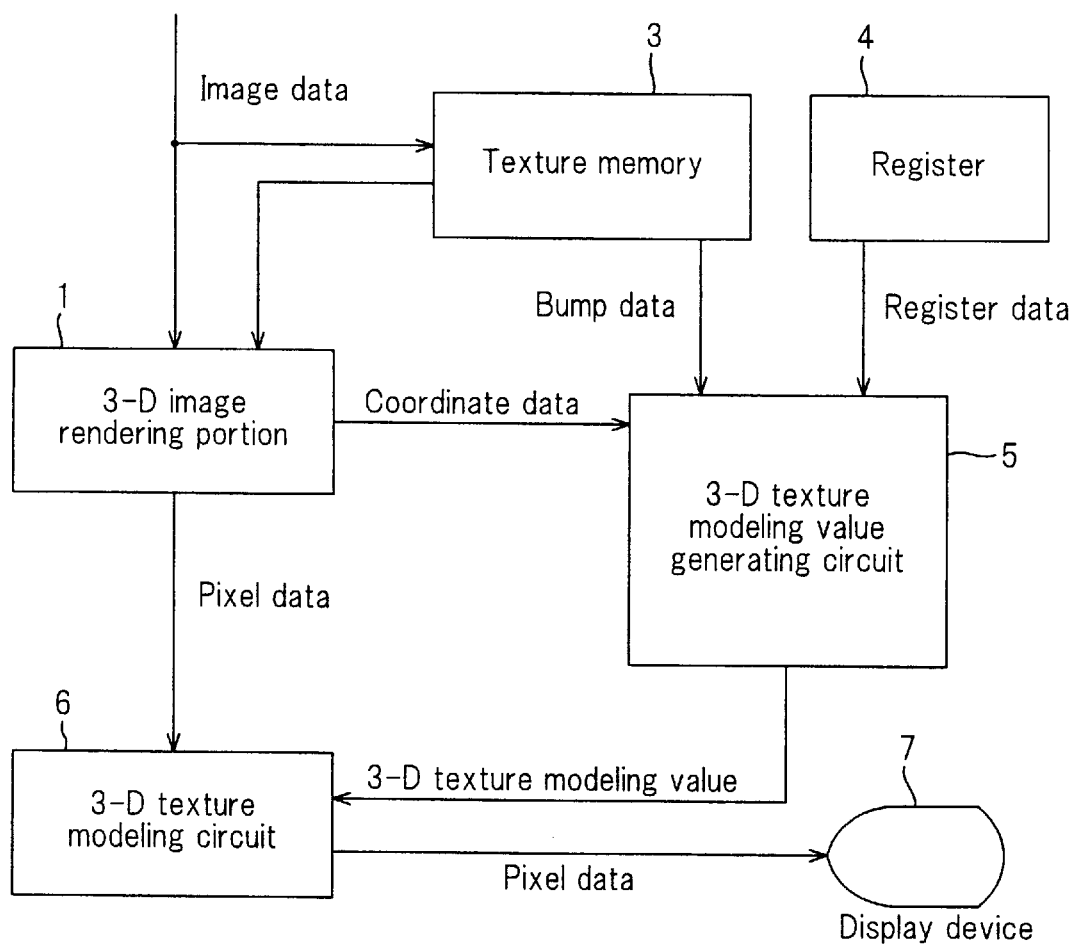
FIG. 16 is a block diagram showing the third embodiment of a three-dimensional image rendering system using a texture 3-D texture modeling device in accordance with the invention.

FIG. 16 is a block diagram showing the third embodiment of a three-dimensional image rendering system. This image rendering system uses a 3-D image rendering portion 1 without frame memory 2. In the above image rendering system, the data from frame memory 2 is sequentially loaded from the leftmost pixel to the right. Therefore, even if there is no frame memory 2, the process can be effected if the data of pixels can be acquired in this order from 3-D image rendering portion 1, and a data output order of this type is still the norm.

Although in the above description, frame memory 2 was assumed to be of a line buffer, this was done only to simplify the description. In practice, there is no need to provide a line buffer for the input portion of the 3-D texture modeling circuit. For example, the line buffer in the description for the 3-D image rendering system shown in FIG. 1 represents the pixel data stream for each polygon to be output from 3-D image rendering portion 1; the line buffer for the 3-D image rendering system shown in FIG. 15 represents the pixel data stream sequentially read from frame memory 2; and the line buffer for the 3-D image rendering system shown in FIG. 16 represents the pixel data stream for each line output from 3-D image rendering portion 1.

In accordance with the first through fourteenth features of the invention, the 3-D texture modeling value generating means determines 3-D texture modeling values and the 3-D texture modeling means simulates a 3-D appearance by shifting the displayed positions of the pixels in accordance with the 3-D texture modeling values. Therefore, even if the view point and/or an object being displayed moves, the texture is 3-D modeled in accordance with the movement, thus making it possible to produce a natural image. Since the texture itself is 3-D modeled, it is possible to perform 3-D rendering with a minimum number of polygons because polygons do not need to be provided in accordance with asperities, thus achieve a shorter processing time.

In addition to the above effects, in accordance with the second feature of the invention, since the 3-D texture modeling values are calculated from the image data containing a line-of-sight vector, a surface normal vector, bump data and depth values, the operation can be performed automatically without needing any setting from the user.

In accordance with the third to sixth features of the invention, since the 3-D texture modeling values are adapted to be able be arbitrarily varied, the operation for varying the magnitudes of the asperities can be simplified, without needing either point-by-point application of textures or an extra capacity of the texture memory.

In accordance with the seventh feature of the invention, the 3-D texture modeling means shifts each pixels in accordance with the 3-D texture modeling values so that the neighboring pixel or pixels located in the opposite direction to the shift are pulled together with the movement of the pixel in question. Therefore, it is possible to warp the edges of the polygon onto which the texture is mapped. As a result it is possible to obtain an effect of simulation in which, for example a flag is fluttering at its edges. In this way, it is possible to change the shape of the polygon itself in accordance with irregularities, and hence the image processing can be performed with a lower number of polygons.

In accordance with the eighth feature of the invention, since the 3-D texture modeling means shifts each pixel from its original position in accordance with the 3-D texture modeling value, a number of bumps can be represented by a single polygon, thus making it possible to reduce the processing time.

In accordance with the ninth through eleventh features of the invention, since the 3-D modeled texture is added with shadows by bump mapping, it is possible to produce a further more natural image.

In accordance with the twelfth feature of the invention, the data of an image onto which a texture is applied is stored into the frame memory and the thus stored image data is subjected to a 3-D texture modeling process. Therefore, 3-D texture modeling can be performed from the data with hidden surfaces deleted. As a result, the 3-D rendering can be performed by processing a lower amount of data.

In accordance with the thirteen feature of the invention, a 3-D modeled image is displayed after the image data has been stored into the frame memory. Accordingly, it is possible to perform essential processing for hidden surfaces with irregularities, after the 3-D texture modeling process has been made.

In accordance with fourteen feature of the invention, since no frame memory is needed, it is possible to reduce the cost.

What is claimed is:

1. A three-dimensional texture mapping processing apparatus for producing a 3-D modeled texture, comprising:

a 3-D texture modeling value generating means for determining 3-D texture modeling values which indicate quantities by which pixels in the texture data are shifted from the original coordinates of the pixels existing on a polygon surface; and a 3-D texture modeling means for producing a 3-D appearance in a simulating manner from a two-dimensional image viewed in a line-of-sight direction, by shifting the displayed positions of the pixels in accordance with the 3-D texture modeling values.

2. The three-dimensional texture mapping processing apparatus according to claim 1, wherein the 3-D texture modeling value generating means computes the 3-D texture modeling values based on the image data containing a line-of-sight vector, a surface normal vector, bump data and depth data.

3. The three-dimensional texture mapping processing apparatus according to claim 1, wherein the 3-D texture modeling value generating means can produce a discretionary modified 3-D appearance by multiplying 3-D texture modeling values by a parameter.

4. The three-dimensional texture mapping processing apparatus according to claim 2, wherein the 3-D texture modeling value generating means can produce a discretionary modified 3-D appearance by multiplying 3-D texture modeling values by a parameter.

5. The three-dimensional texture mapping processing apparatus according to claim 1, wherein the 3-D texture modeling value generating means can produce a discretionary modified 3-D appearance by altering the 3-D texture modeling values based on an index table.

6. The three-dimensional texture mapping processing apparatus according to claim 2, wherein the 3-D texture modeling value generating means can produce a discretionary modified 3-D appearance by altering the 3-D texture modeling values based on an index table.

7. The three-dimensional texture mapping processing apparatus according to claim 1, wherein the 3-D texture modeling means, as assuming the 3-D texture modeling values to be the quantities representing variations in the position of the surface of a polygon, shifts the pixels in accordance with the 3-D texture modeling values so that the neighboring pixel or pixels in the opposite direction to the shift are pulled together.

8. The three-dimensional texture mapping processing apparatus according to claim 1, wherein the 3-D texture modeling means, as assuming the 3-D texture modeling values to be the quantities representing variations in the height of the surface of a polygon, shifts the pixels from their original positions in accordance with the 3-D texture modeling values and the slope value of the surface viewed from the line-of-sight direction.

9. The three-dimensional texture mapping processing apparatus according to claim 1, wherein the 3-D modeled texture is added with shadows by bump mapping.

10. The three-dimensional texture mapping processing apparatus according to claim 7, wherein the 3-D modeled texture is added with shadows by bump mapping.

11. The three-dimensional texture mapping processing apparatus according to claim 8, wherein the 3-D modeled texture is added with shadows by bump mapping.

12. A three-dimensional image rendering system comprising:

an image rendering means for generating image data representing a 3-D graphic image by texture mapping;

a frame memory storing the image data generated by the image rendering means;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels in the frame memory in accordance with the 3-D texture modeling values; and a display device for displaying the image data generated in the 3-D texture modeling means.

13. A three-dimensional image rendering system comprising:

an image rendering means for generating image data representing a 3-D graphic image by texture mapping;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels output from the image rendering means in accordance with the 3-D texture modeling values;

a frame memory for storing the image data generated by the 3-D texture modeling means; and a display device for displaying the image data produced in the frame memory.

14. A three-dimensional image rendering system comprising:

an image rendering means for generating image data representing a 3-D graphic image by texture mapping;

a texture memory storing data of a texture;

a 3-D texture modeling value generating means which, in order to produce a 3-D representation of a texture, determines 3-D texture modeling values indicating quantities by which the pixels are shifted from their original coordinates on the polygon surface, based on the texture data and the coordinate data from the image rendering means;

a 3-D texture modeling means for producing a 3-D appearance in a simulating manner from a two-dimensional image viewed in a line-of-sight direction, by shifting the pixels output from the image rendering means in accordance with the 3-D texture modeling values; and a display device for displaying the image data produced through the 3-D texture modeling means.

* * * * *